(12) United States Patent
Yang et al.

(10) Patent No.: US 12,736,169 B2
(45) Date of Patent: Sep. 15, 2026

(54) PIPE INSPECTION CAMERA SYSTEM

(71) Applicants: SHENZHEN CHAOYUEFEI TECHNOLOGY CO., LTD., Shenzhen (CN); SHENZHEN ANDELIAN TECHNOLOGY CO., LTD., Shenzhen (CN)

(72) Inventors: Liudongting Yang, Shenzhen (CN); Shaohua Zhong, Shenzhen (CN)

(73) Assignees: SHENZHEN CHAOYUEFEI TECHNOLOGY CO., LTD., Shenzhen (CN); SHENZHEN ANDELIAN TECHNOLOGY CO., LTD., Shenzhen (CN)

( * ) Notice: Subject to any disclaimer, the term of this patent is extended or adjusted under 35 U.S.C. 154(b) by 30 days.

(21) Appl. No.: 19/432,976

(22) Filed: Dec. 25, 2025

(65) Prior Publication Data

US 2026/0139787 A1 May 21, 2026

(30) Foreign Application Priority Data

Nov. 15, 2024 (CN) ......................... 202430725536.4
Jan. 25, 2025 (CN) ......................... 202530051212.1

(51) Int. Cl.

| | |
|---|---|
| ***F16L 55/40*** | (2006.01) |
| ***F16L 55/32*** | (2006.01) |
| ***F16L 101/30*** | (2006.01) |
| ***F16M 11/10*** | (2006.01) |
| ***F16M 11/18*** | (2006.01) |
| ***F16M 11/42*** | (2006.01) |
| ***H04N 23/50*** | (2023.01) |
| ***H04N 23/63*** | (2023.01) |

(52) U.S. Cl.
CPC ............... *F16L 55/40* (2013.01); *F16L 55/32* (2013.01); *F16M 11/10* (2013.01); *F16M 11/18* (2013.01); *F16M 11/42* (2013.01); *H04N 23/555* (2023.01); *H04N 23/63* (2023.01); *F16L 2101/30* (2013.01)

(58) Field of Classification Search
None
See application file for complete search history.

(56) References Cited

U.S. PATENT DOCUMENTS 5,195,392 A * 3/1993 Moore .................... F16L 55/18 356/241.3
11,248,982 B2 * 2/2022 Krohlow ................. F16L 55/30
11,892,373 B2 * 2/2024 Krohlow ................. F16L 55/30
2018/0016971 A1 1/2018 Yamashita et al.

* cited by examiner

*Primary Examiner* — Peter J Macchiarolo
*Assistant Examiner* — Jermaine L Jenkins
(74) *Attorney, Agent, or Firm* — HOWARD M COHN and Associates, LLC

(57) ABSTRACT

A pipe inspection camera system includes an endoscopic camera configured to capture images of an interior of a pipeline, a display module configured to be electrically connected to the cable to receive and display the images captured by the endoscopic camera, a cable configured to electrically connect the endoscopic camera and the display module, and a support device. The support device includes a support body, a first wheel assembly connected to the support body, and a telescopic pull rod assembly connected to the support body. The support body is configured to carry the endoscopic camera, the cable, and the display module, and the telescopic pull rod assembly is configured to cooperate with the first wheel assembly to allow users to move the pipe inspection camera system.

20 Claims, 22 Drawing Sheets

PIPE INSPECTION CAMERA SYSTEM

CROSS-REFERENCE TO RELATED APPLICATIONS

This application claims priority of Chinese patent application CN202430725536.4, filed on Nov. 15, 2024, and Chinese patent application CN202530051212.1, filed on Jan. 25, 2025, the entire contents of which are incorporated herein by reference.

FIELD

The present disclosure relates to pipeline inspection technologies, and in particular, to a pipe inspection camera system.

BACKGROUND

As a type of pipe inspection equipment, a pipe inspection camera system generally includes an endoscopic camera, a cable, a display module, and a support device. The support device supports the cable and the display module, while the endoscopic camera is connected to the display module via the cable, enabling internal images of the pipe captured by the endoscopic camera to be displayed on the display module. However, in existing pipe inspection camera systems, the cable, the display module, and the support device are relatively heavy, making them inconvenient to carry and move. Thus, improvements are necessary.

SUMMARY

In order to solve shortcomings in existing technologies, the present disclosure is to provide a pipe inspection camera system to solve above technological problems.

A pipe inspection camera system includes an endoscopic camera configured to capture images of an interior of a pipeline, a display module configured to be electrically connected to the cable to receive and display the images captured by the endoscopic camera, a cable configured to electrically connect the endoscopic camera and the display module, and a support device. The support device includes a support body, a first wheel assembly connected to the support body, and a telescopic pull rod assembly connected to the support body. The support body is configured to carry the endoscopic camera, the cable, and the display module, and the telescopic pull rod assembly is configured to cooperate with the first wheel assembly to allow users to move the pipe inspection camera system.

Beneficial Effects of the present disclosure: the pipe inspection camera system provided in the embodiments of the present disclosure incorporates the telescopic pull rod assembly and the first wheel assembly. The telescopic pull rod assembly works in conjunction with the first wheel assembly to facilitate user movement of the pipe inspection camera system, thereby enhancing portability, ease of transport, and improving the overall user experience.

DETAILED DESCRIPTION

Figure 1:
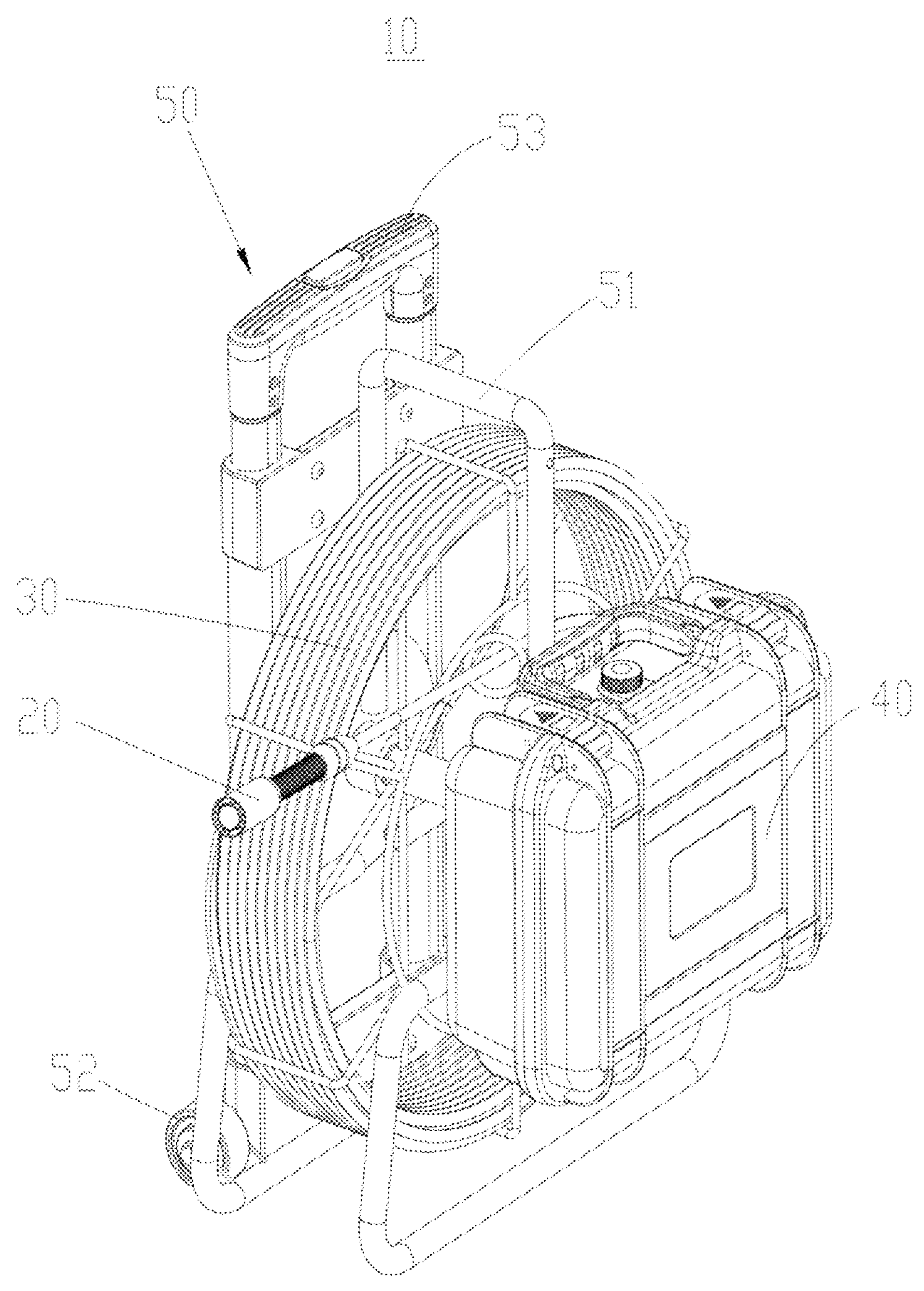
FIG. 1 is a schematic view of a pipe inspection camera system according to a first embodiment of the present disclosure.
Figure 2:
FIG. 2 is a schematic view of the pipe inspection camera system according to the first embodiment of the present disclosure from another perspective.
Figure 2:
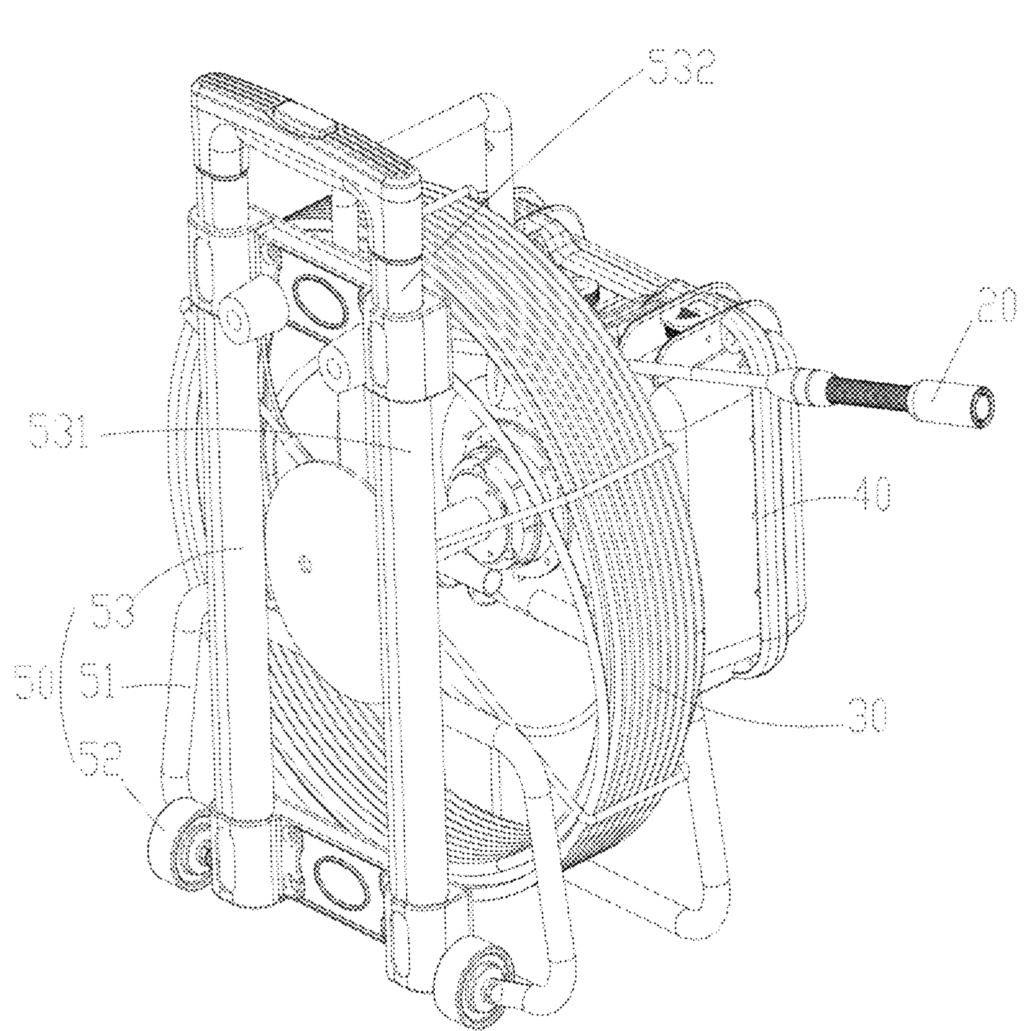
Figure 3:
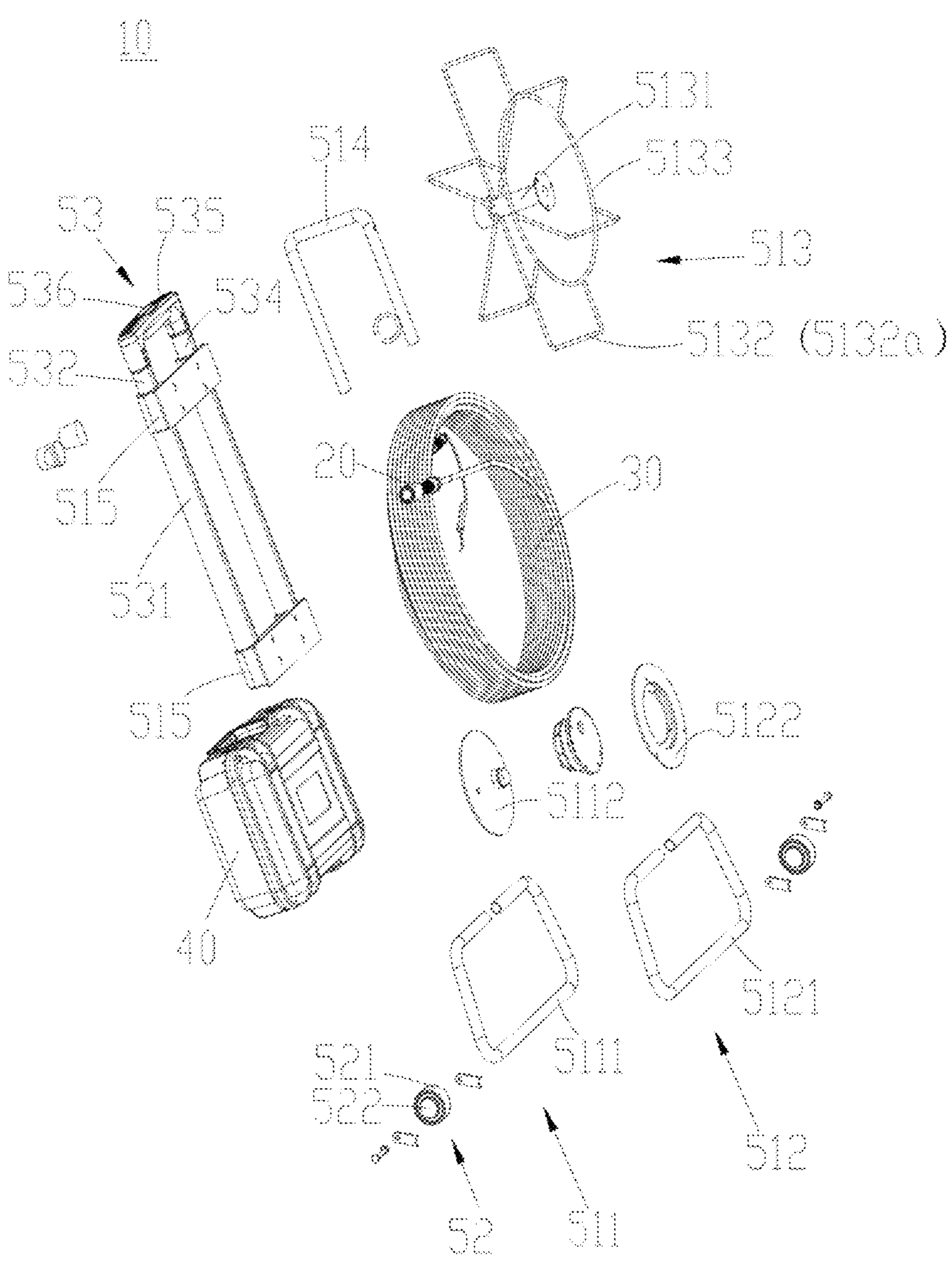
FIG. 3 is an exploded view of the pipe inspection camera system according to the first embodiment of the present disclosure.
Figure 4:
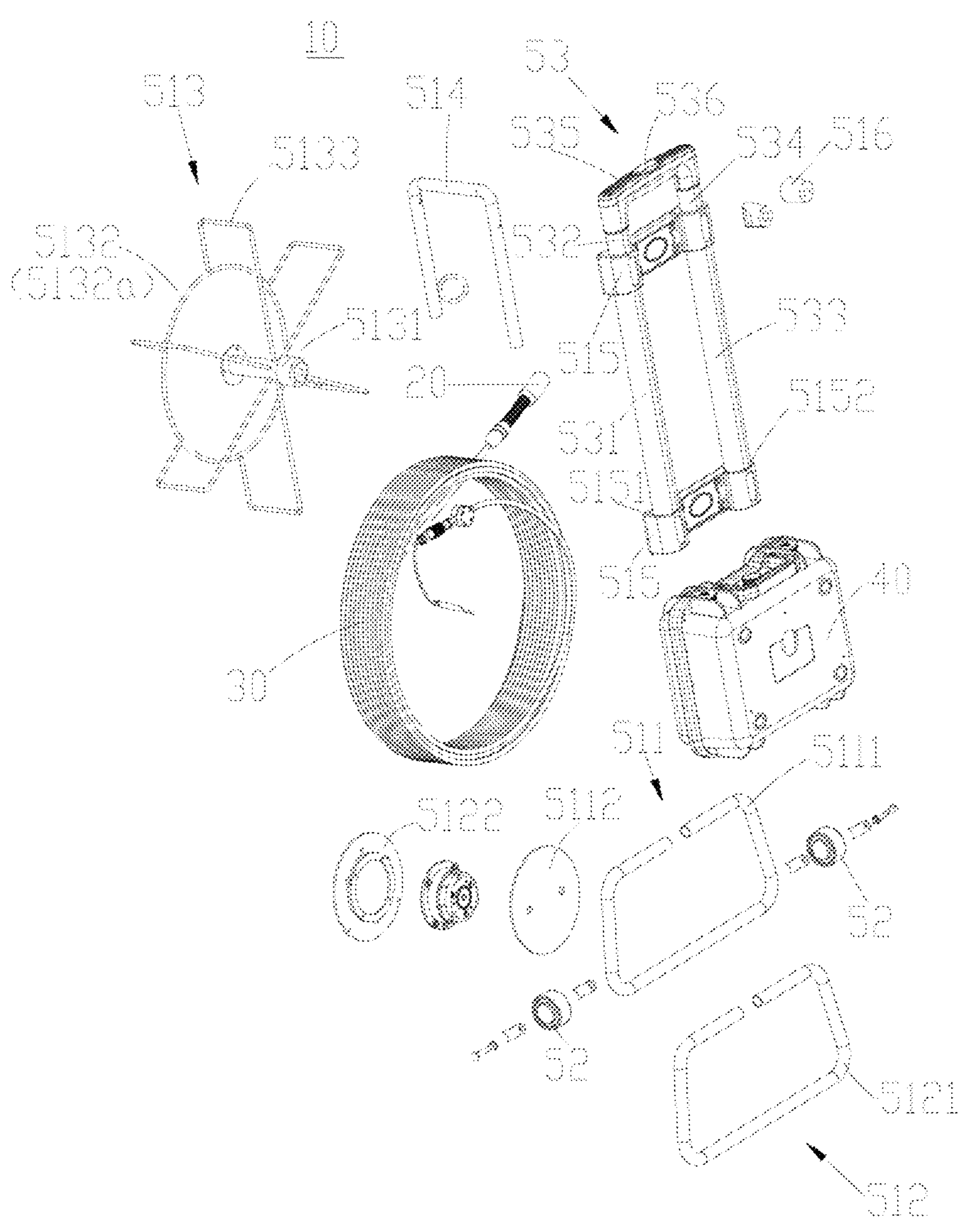
FIG. 4 is an exploded view of the pipe inspection camera system according to the first embodiment of the present disclosure from another perspective.
Figure 5:
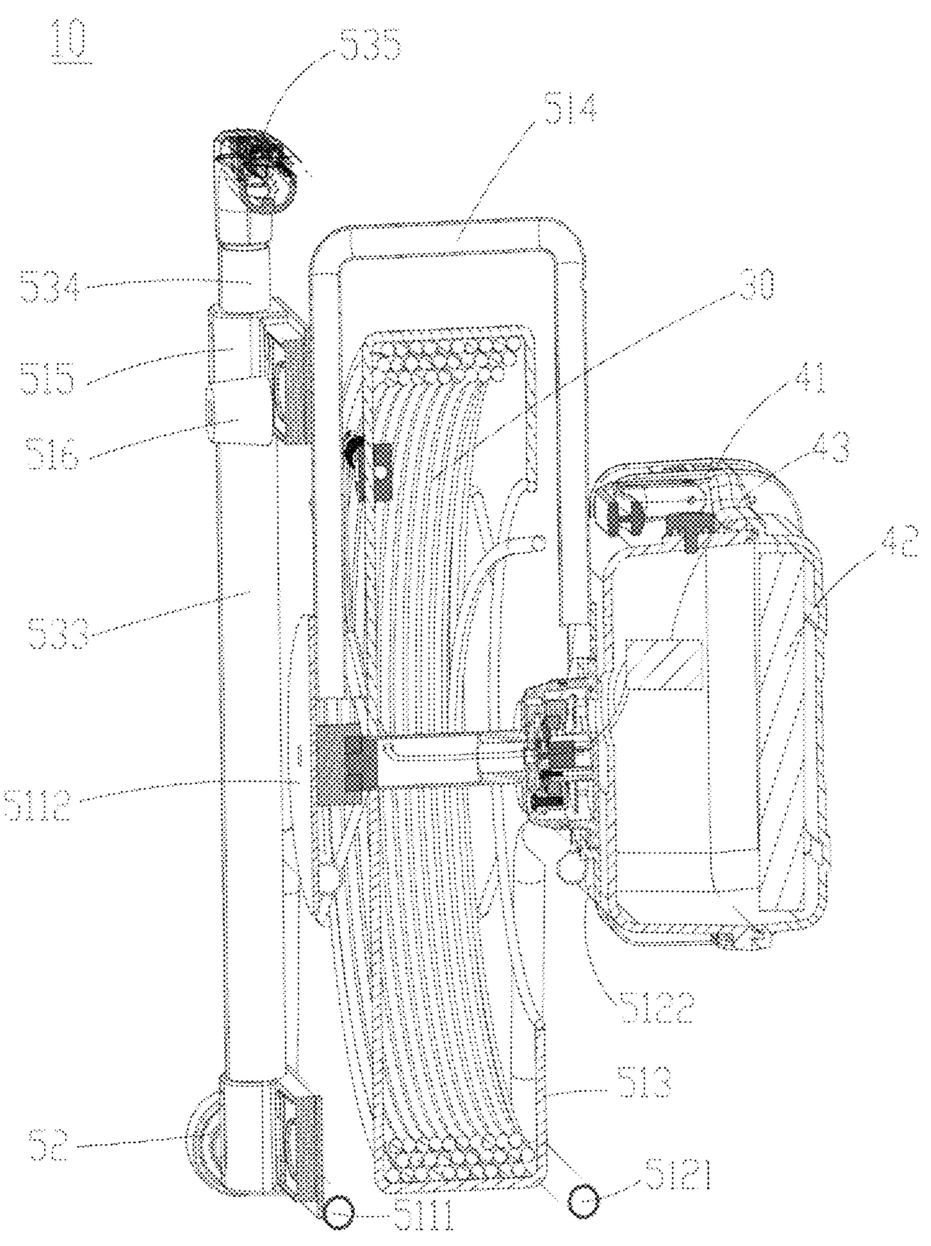
FIG. 5 is a cross-sectional view of the pipe inspection camera system according to the first embodiment of the present disclosure.

To make objectives, technical solutions, and advantages of the present disclosure clearer, the present disclosure will be further described in detail below with reference to accompanying drawings and specific embodiments. It should be understood that specific embodiments described herein are merely illustrative of the present disclosure and are not intended to limit the present disclosure.

Embodiment I

Please referring to FIGS. 1-5, a first embodiment of the present disclosure provides a pipe inspection camera system 10. The pipe inspection camera system 10 includes an endoscopic camera 20, a cable 30, a display module 40, and a support device 50. The endoscopic camera 20 is configured to capture images to inspect an interior of a pipeline. The cable 30 is configured to be electrically connected to the endoscopic camera 20. The display module 40 is configured to be electrically connected to the cable to receive and display the images captured by the endoscopic camera 20. The support device 50 includes a support body 51, a first wheel assembly 52 connected to the support body 51, and a telescopic pull rod assembly 53 connected to the support body 51. The support body 51 is configured to carry the endoscopic camera 20, the cable 30, and the display module 40. The telescopic pull rod assembly 53 cooperates with the first wheel assembly 52 to allow users to easily move the pipe inspection camera system 10.

The pipe inspection camera system 10 provided in this embodiment of the present disclosure includes the telescopic pull rod assembly 53 and the first wheel assembly 52. The telescopic pull rod assembly 53 works in conjunction with the first wheel assembly 52 to facilitate movement of the pipe inspection camera system 10, making it easier for users to carry and transport the system, thereby enhancing the user experience.

Specifically, the display module 40 may include a housing 41, a display screen 42 arranged in the housing 41, and a control box 43 arranged in the housing 41 and electrically connected to the display screen 42. The housing 41 may include a main body and a cover rotationally connected to the main body to enclose an accommodating space for accommodating the display screen 42 and the control box 43. The cover can be rotated to open the housing 41 to expose the display screen 42 for image display and to facilitate user operation of the control box 43.

Figure 6:
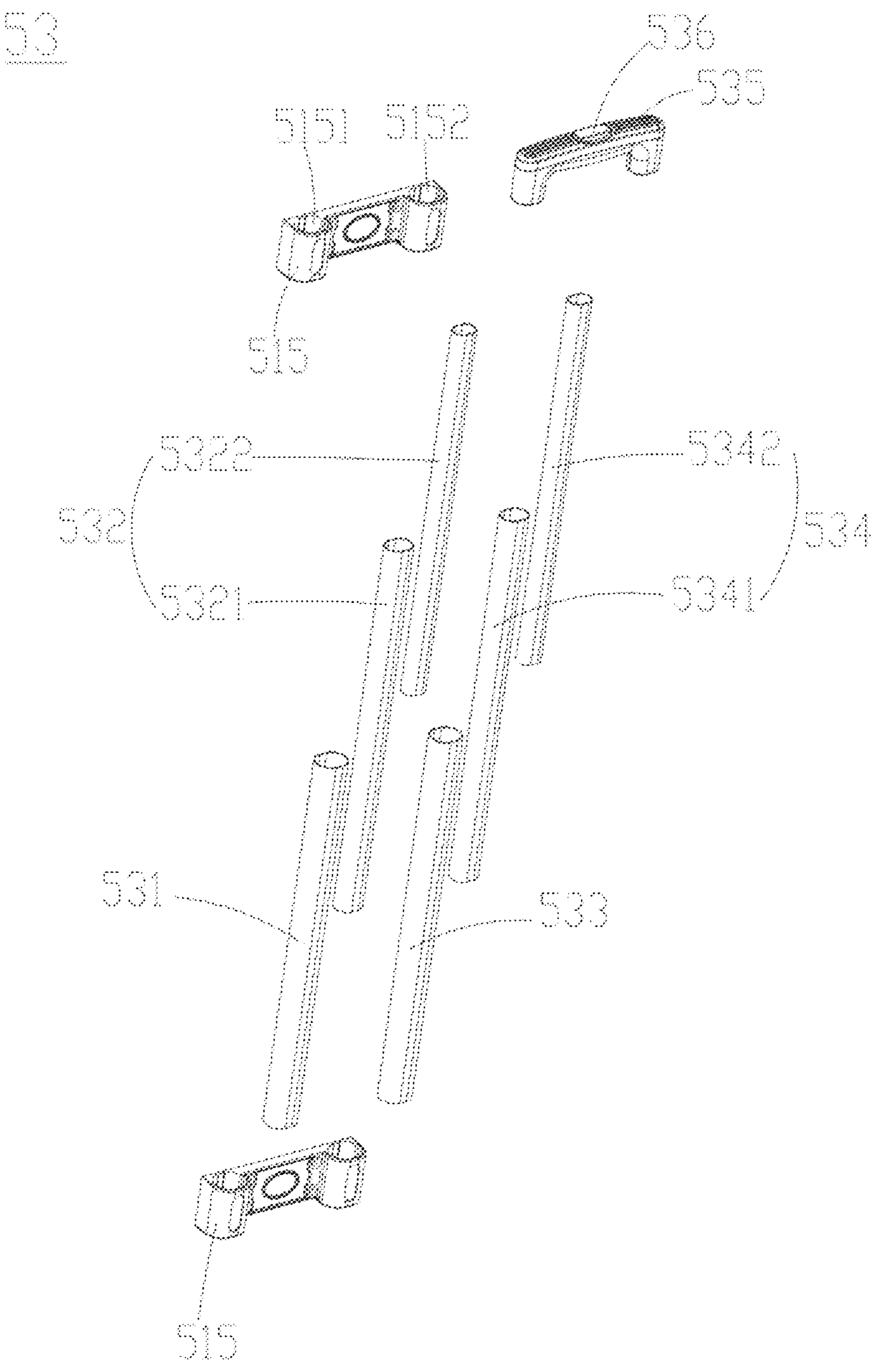
FIG. 6 is an exploded view of a telescopic pull rod assembly of the pipe inspection camera system according to the first embodiment of the present disclosure.
Figure 7:
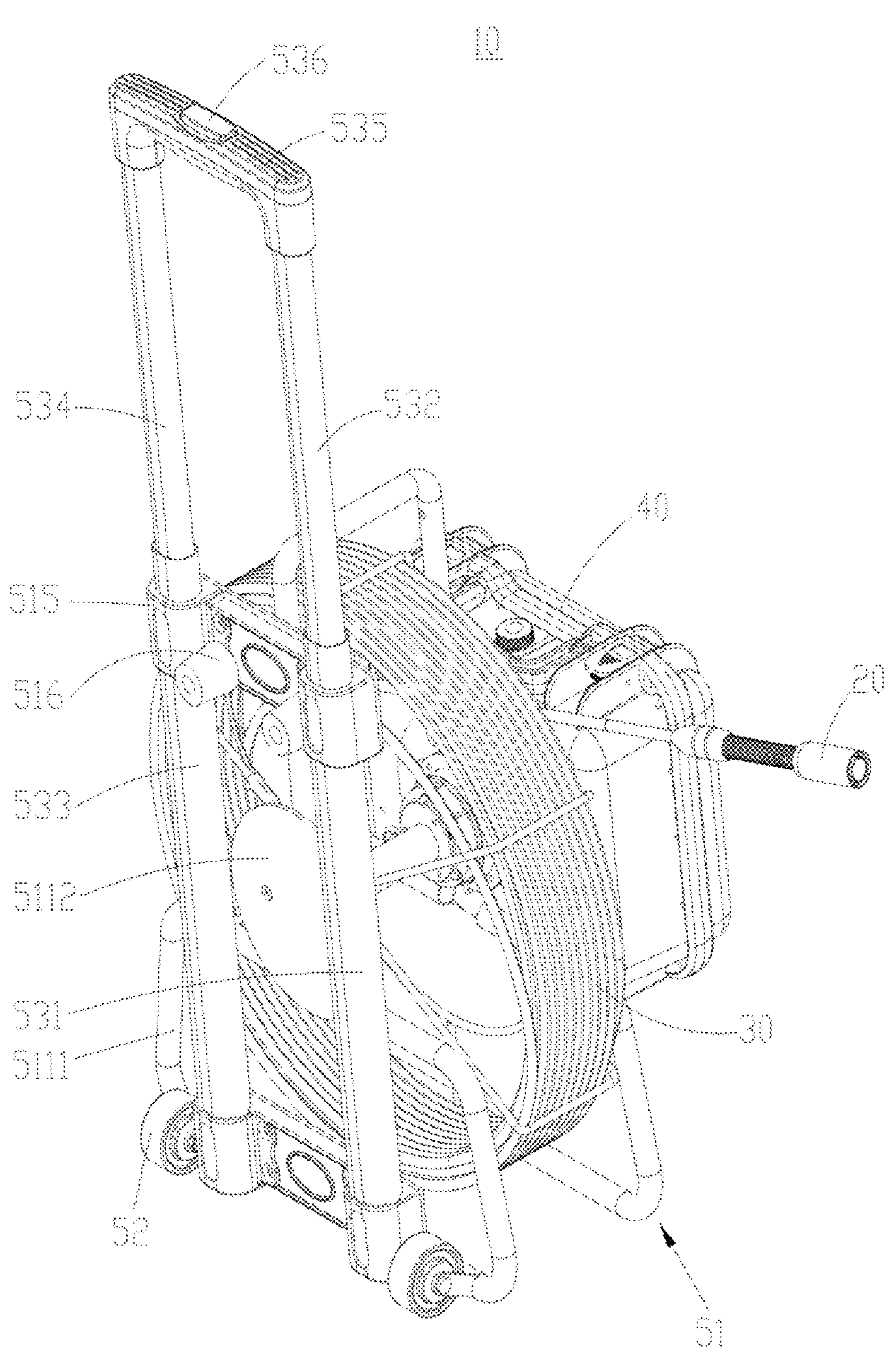
FIG. 7 is a schematic view of the telescopic pull rod assembly of the pipe inspection camera system according to the first embodiment of the present disclosure in a pulled-out state.
Figure 8:
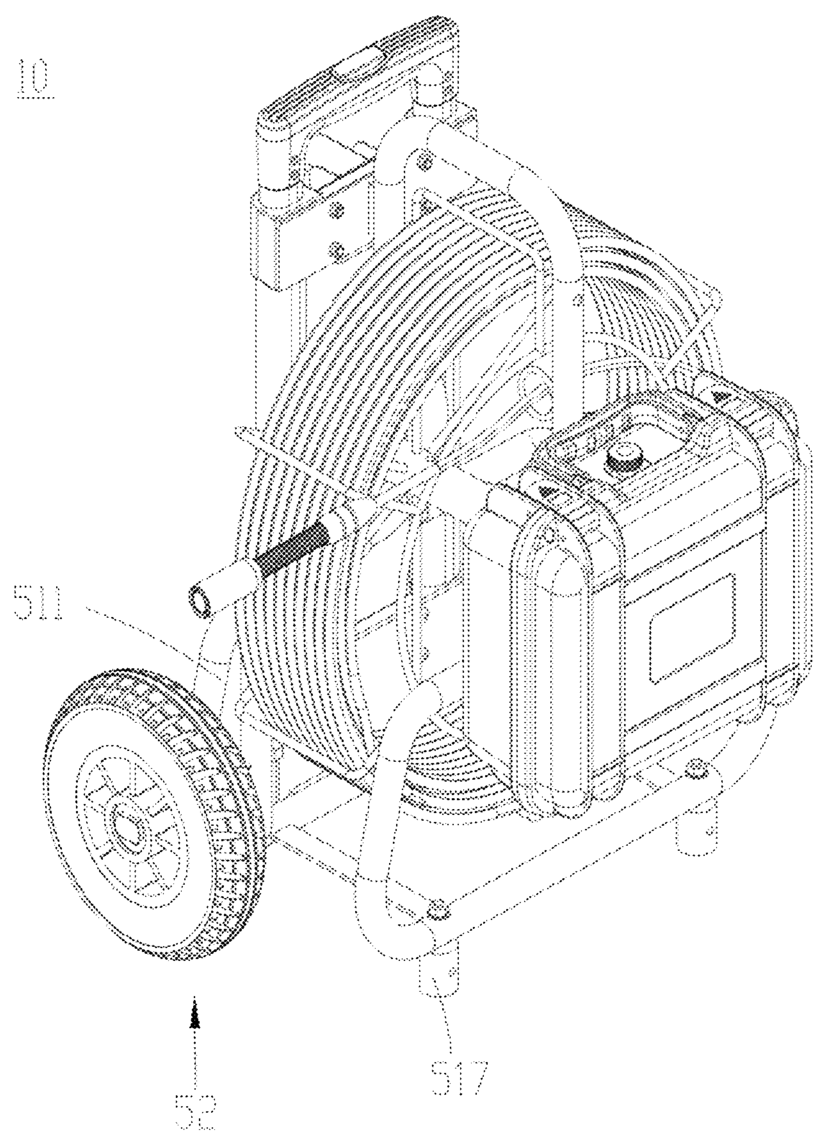
FIG. 8 is a schematic view of a pipe inspection camera system according to a second embodiment of the present disclosure.
Figure 9:
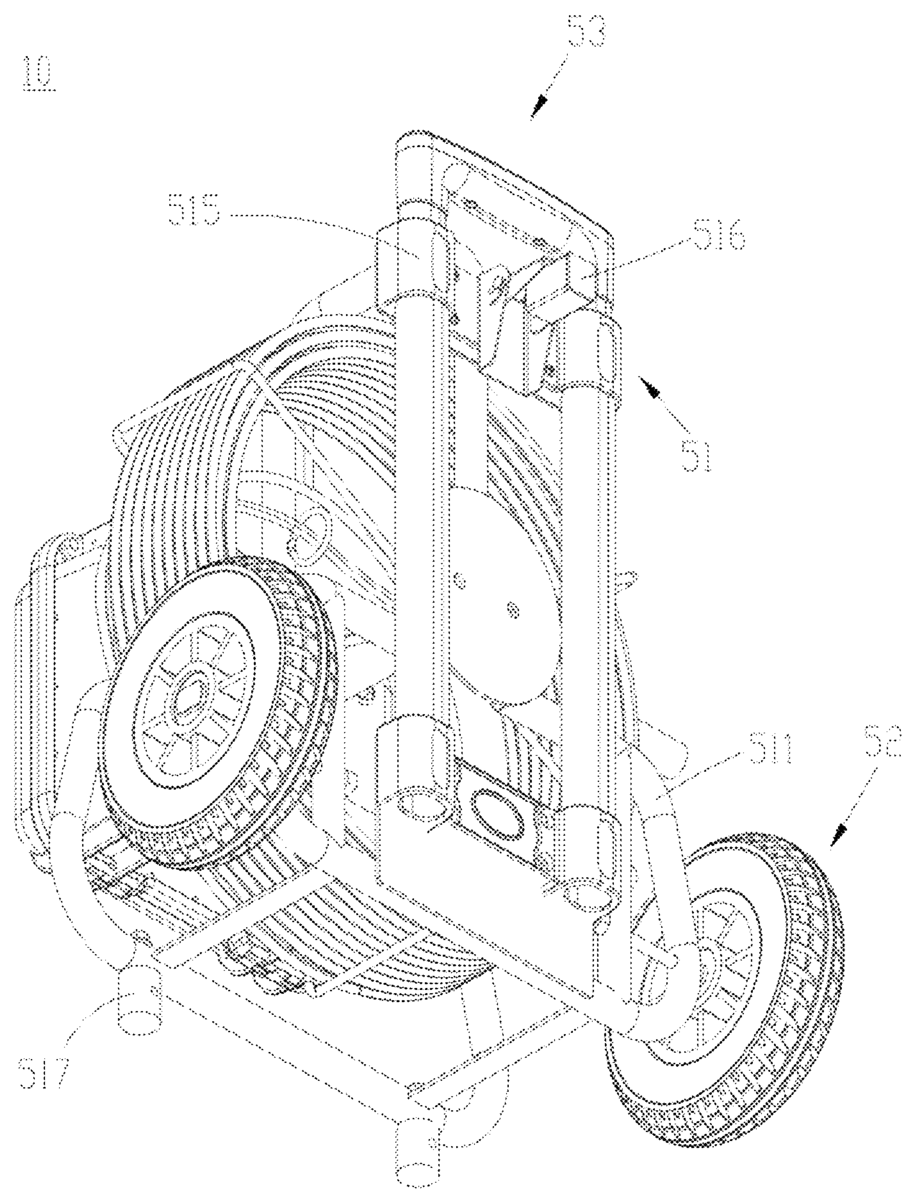
FIG. 9 is a schematic view of the pipe inspection camera system according to the second embodiment of the present disclosure from another perspective.
Figure 10:
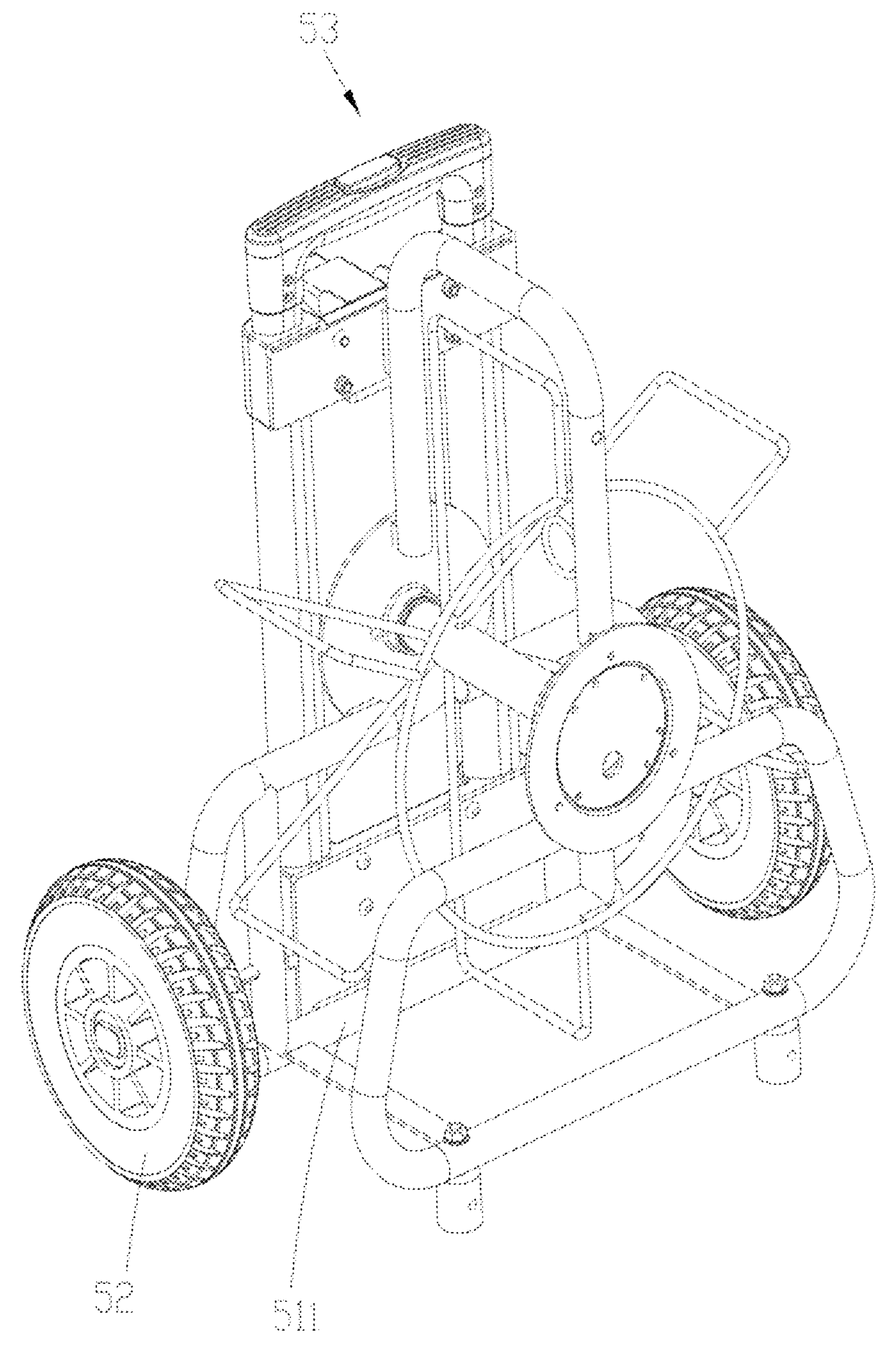
FIG. 10 is a schematic view of a support device of the pipe inspection camera system according to the second embodiment of the present disclosure.
Figure 11:
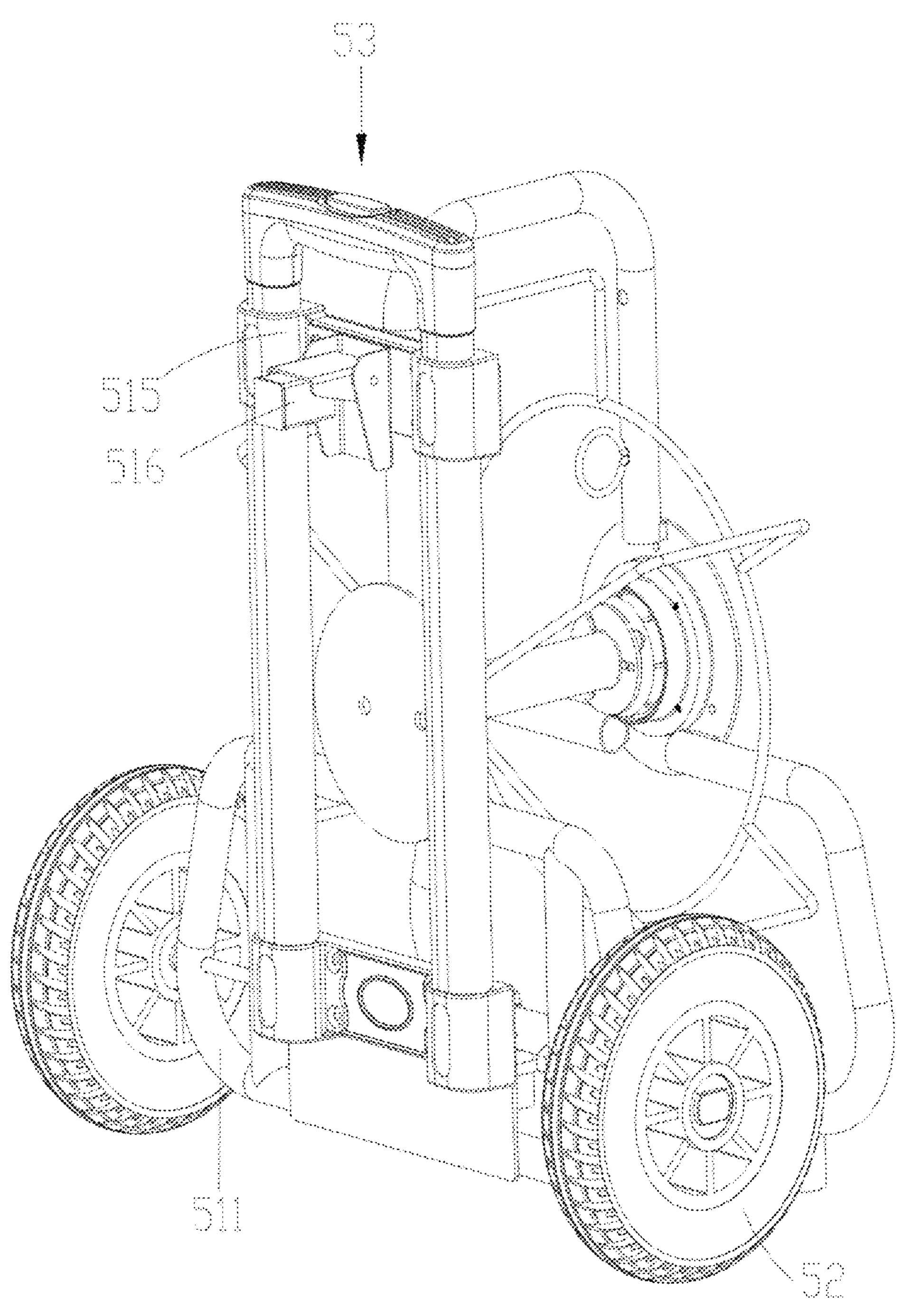
FIG. 11 is a schematic view of the support device of the pipe inspection camera system according to the second embodiment of the present disclosure from another perspective.
Figure 12:
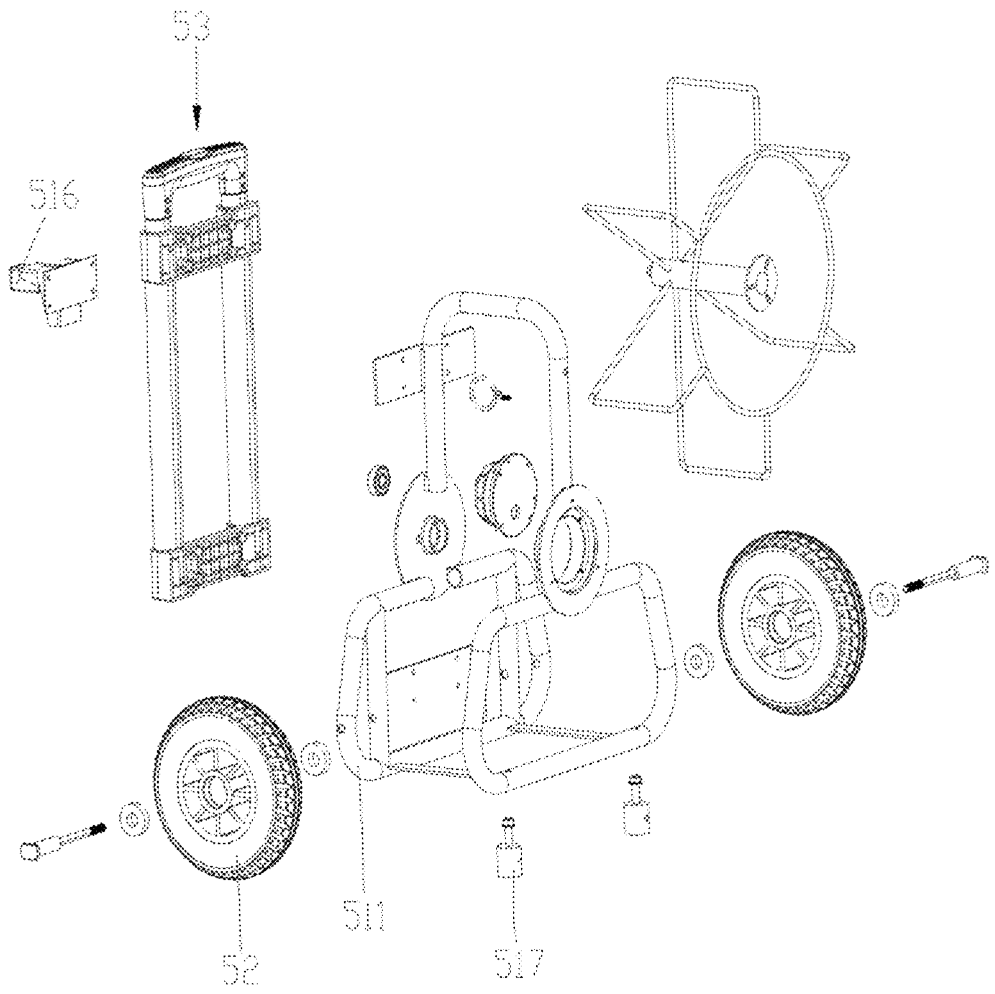
FIG. 12 is an exploded view of the support device of the pipe inspection camera system according to the second embodiment of the present disclosure.
Figure 13:
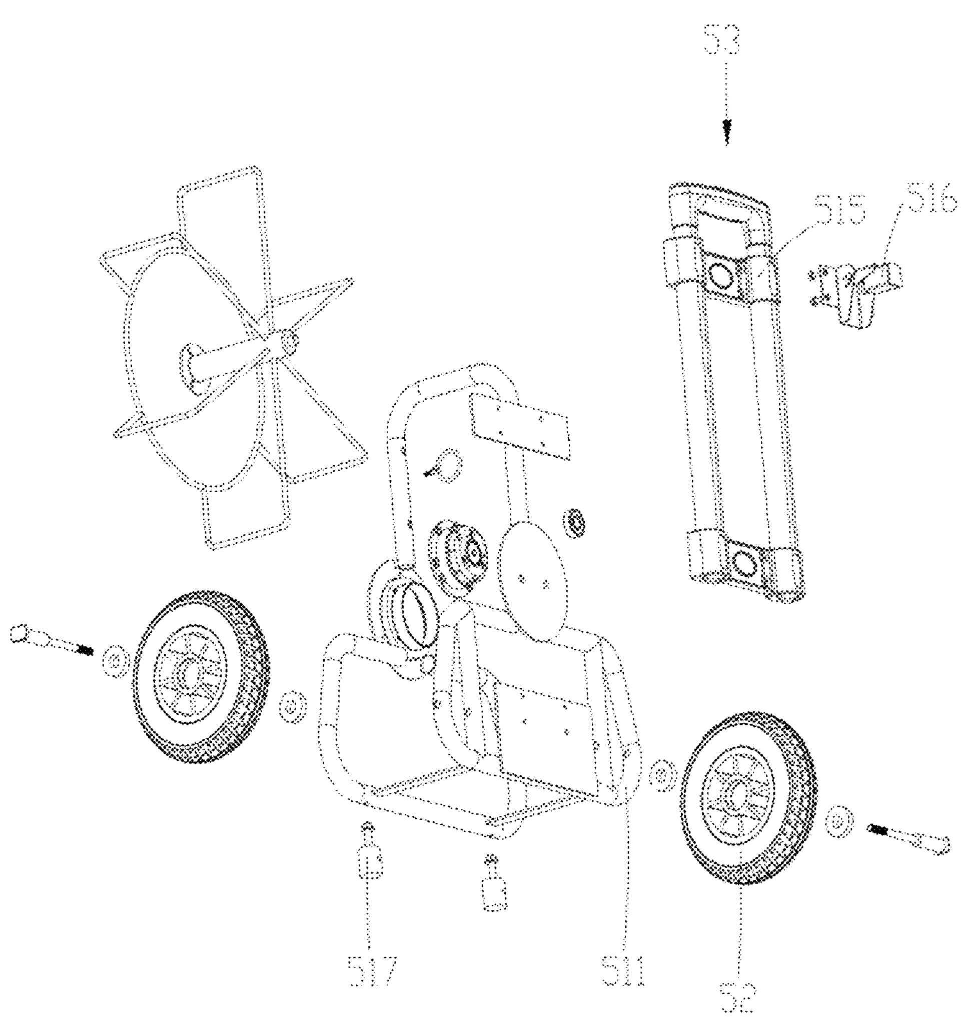
FIG. 13 is an exploded view of the support device of the pipe inspection camera system according to the second embodiment of the present disclosure from another perspective.
Figure 14:
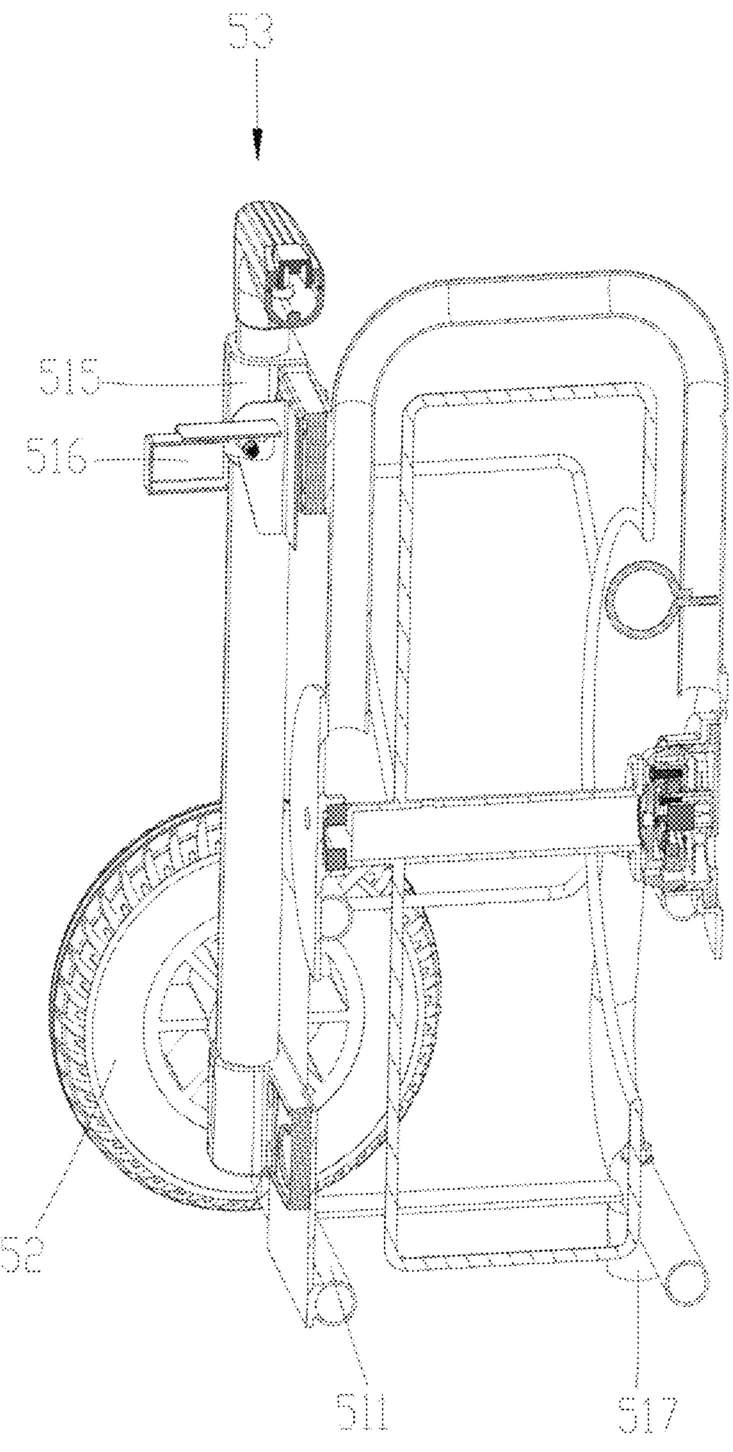
FIG. 14 is a cross-sectional view of the support device of the pipe inspection camera system according to the second embodiment of the present disclosure.

Specifically, referring to FIGS. 6 and 7, the telescopic pull rod assembly 53 includes a first rod segment 531 and at least one second rod segment 532 telescopically connected to the first rod segment 531. The at least one second rod segment 532 can be slidably retracted into the first rod segment 531 to adjust a height of the telescopic pull rod assembly 53.

As shown in FIG. 1, the telescopic pull rod assembly 53 is in a retracted state, the at least one second rod segment 532 is slidably retracted into the first rod segment 531, and the telescopic pull rod assembly 53 is in a first height. As shown in FIG. 7, the telescopic pull rod assembly 53 is in an extended state, a portion of the at least one second rod segment 532 extends outside the first rod segment 531, and the telescopic pull rod assembly 53 is in a second height that is greater than the first height.

Furthermore, the telescopic pull rod assembly 53 further includes a first connecting rod 535. The first connecting rod 535 is connected to the at least one second rod segment 532 and extends in a direction perpendicular to a telescoping direction of the telescopic pull rod assembly 53. The first connecting rod 535 is configured to allow a user to operation to drive part of the at least one second rod segment 532 to slide into or out of the first rod segment 531, thereby changing the height of the telescopic pull rod assembly 53. It can be understood that the first connecting rod 535 facilitates user operation and handling of the telescopic pull rod assembly 53.

In this embodiment, the telescopic pull rod assembly 53 further includes a third rod segment 533 and at least one fourth rod segment 534 telescopically connected to the third rod segment 533. The first connecting rod 535 is connected between the at least one second rod segment 532 and the at least one fourth rod segment 534. The at least one fourth rod segment 534 can be slidably retracted into the third rod segment 533. Operation on the first connecting rod 535 can drive part of the at least one second rod segment 532 and part of the at least one fourth rod segment 534 to slide into or out of the first rod segment 531 and the third rod segment 533, respectively, thereby changing the height of the telescopic pull rod assembly 53.

Additionally, the telescopic pull rod assembly 53 includes a locking assembly 536. At least a portion of the locking assembly 536 is arranged on the first connecting rod 535. The locking assembly 536 is configured to lock a position of the at least one second rod segment 532 relative to the first rod segment 531. When the locking assembly 536 is in a locked state, the position of the at least one second rod segment 532 relative to the first rod segment 531 is fixed, thereby fixing the height of the telescopic pull rod assembly 53. When the locking assembly 536 is operated to an unlocked state, operation on the first connecting rod 535 can drive the at least one second rod segment 532 to slide in the first rod segment 531, so as to adjust the height of the telescopic pull rod assembly 53. It can be understood that the locking assembly 536 is structurally similar to a locking assembly commonly used on a telescopic luggage, and its specific structure will not be elaborated here.

The at least one second rod segment 532 includes a first sub-rod segment 5321 and a second sub-rod segment 5322. The first sub-rod segment 5321 is slidably connected to the first rod segment 531 and at least part of the first sub-rod segment 5321 can be slidably retracted into or extended out of the first rod segment 531. The second sub-rod segment 5322 is slidably connected to the first sub-rod segment 5321 and at least part of the second sub-rod segment 5322 can be slidably retracted into or extended out of the first sub-rod segment 5321. It can be understood that the inclusion of the first sub-rod segment 5321 and the second sub-rod segment 5322 in the at least one second rod segment 532 provides the telescopic pull rod assembly 53 with a larger height adjustment range, making it convenient for users of different heights to operate.

Similarly, the at least one fourth rod segment 534 includes a third sub-rod segment 5341 and a fourth sub-rod segment 5342. The third sub-rod segment 5341 is slidably connected to the third rod segment 533 and at least part of the third sub-rod segment 5341 can be slidably retracted into or extended out of the third rod segment 533. The fourth sub-rod segment 5342 is slidably connected to the third sub-rod segment 5341 and at least part of the fourth sub-rod segment 5342 can be slidably retracted into or extended out of the third sub-rod segment 5341.

Furthermore, the support body 51 includes a first support frame 511 and a second support frame 512 connected to the first support frame 511. The first support frame 511 and the second support frame 512 are arranged opposite to each other. The cable 30 is arranged between the first support frame 511 and the second support frame 512. The telescopic pull rod assembly 53 is connected to the first support frame 511, the first wheel assembly 52 is connected to the bottom of the first support frame 511, and the display module 40 is connected to the second support frame 512. It is understandable that this structural configuration results in a reasonable and compact overall layout for the pipe inspection camera system 10, which can ensure sufficient support strength while facilitating system miniaturization and weight reduction.

Additionally, the support body 51 includes a cable reel 513 connected between the first support frame 511 and the second support frame 512. The cable reel is rotatable relative to the support frame to wind or unwind the cable on the cable reel, thereby adjusting the extension length of the endoscopic camera 20 and the cable 30 (e.g., the length extending into the pipeline under inspection).

The support body 51 further includes a carrying handle 514 connected between the first support frame 511 and the second support frame 512 at the top of the support body 51. The carrying handle 514 is located on an outer side of the cable reel 513 and includes a U-shaped portion that partially surrounds opposite sides and a top side of the cable reel 513.

In this embodiment, the cable reel 513 includes a connecting shaft 5131, a fixing frame 5132, and a connecting frame 5133. The fixing frame 5132 includes a plurality of limiting portions 5132*a* that encircle a periphery of the cable 30 to limit a position of the cable 30. The connecting frame 5133 is arranged on a side of the cable 30 and connects one end of the plurality of limiting portions 5132*a*. The connecting shaft 5131 is connected to the other end of the plurality of limiting portions 5132*a*, and both ends of the connecting shaft 5131 are rotatably connected to the first support frame 511 and the second support frame 512, thus enabling the cable reel 513 to drive the cable 30 to wind or unwind on the cable reel 513 to adjust the extension length of the endoscopic camera 20 and the cable 30.

The first support frame 511 includes a first support bracket 5111 and a first connecting member 5112. The first support bracket 511 is connected to the telescopic pull rod assembly 53. The first wheel assembly 52 is connected to a bottom end of the first support bracket 5111, and the first connecting member 5112 is connected to a top end of the first support bracket 5111. The second support frame 512 includes a second support bracket 5121 and a second connecting member 5122. A bottom end of the second support bracket 5121 is connected to the bottom end of the first support bracket 5111, and the second connecting member 5121 is connected to a top end of the second support bracket 5121. The second connecting member 5122 is arranged opposite to the first connecting member 5112. The display module 40 is connected to the second connecting member 5122 and arranged on a side of the second connecting member 5122 facing away the first connector 5112. The first support bracket 5111 and the second support bracket 5121 may be closed support frames, such as rectangular frames, elliptical frames, or circular frames, or they may be non-closed (open) support frames, such as U-shaped frames, C-shaped frames, or rectangular frames with openings. In the embodiment shown in the drawings, the first support bracket 5111 and the second support bracket 5121 are both rectangular frames with openings, the first connecting member 5112 is connected at the opening of the first support bracket 5111, and the second connecting member 5122 is connected at the opening of the second support bracket 5121. It is understandable that the structural configuration of the first support frame 511 and/or the second support frame 512 helps reduce the weight of the support body 51 while maintaining sufficient support strength, facilitating user portability and movement of the pipe inspection camera system 10.

Furthermore, to further ensure support strength, the support body 51 further includes at least one fixing member 515. The at least one fixing member 515 is fixed to the first support frame 511 and has a first through-hole 5151. At least a portion of the first rod segment 531 of the telescopic pull rod assembly 53 extends into and is fixed in the first through-hole 5151.

In this embodiment, the at least one fixing member 515 has a second through-hole 5152. At least a portion of the third rod segment 533 of the telescopic pull rod assembly 53 extends into and is fixed in the second through-hole 5152. The at least one fixing member 515 is connected between the first rod segment 531 and the third rod segment 533. Specifically, the at least one fixing member 515 can be secured to the first support frame 511 by screws.

Specifically, the number of the at least one fixing member 515 is two. One of the two fixing members 515 is connected between a bottom end of the first rod segment 531 and a bottom end of the third rod segment 533, while another of the two fixing members 515 is connected between a top end of the first rod segment 531 and a top end of the third rod segment 533.

Additionally, the support body 51 includes at least one support protrusion 516. The at least one support protrusion 516 is connected to a side of the at least one fixing member 515 facing away from the first support frame 511 and is configured to support the telescopic pull rod assembly on the ground when the telescopic pull rod assembly 53 is placed adjacent to the ground.

In this embodiment, the first wheel assembly 52 includes at least two wheels 521. Each wheel 521 is rotatably connected to the bottom of the first support frame 511 by rotatably connected to the first support bracket 5111 via a bearing 522, allowing each wheel 521 to rotate relative to the first support frame 511. The at least two wheels 521 and the bottom of the second support frame 512 cooperate to support the pipe inspection camera system 10 on the ground. It is understandable that by rotatably connecting the wheels 521 on the first support bracket 5111 via bearings 522, the first support bracket 5111 provides support for the wheels 521, thereby helping to improve their service life.

Embodiment II

Referring to FIGS. 8-14, a pipe inspection camera system 10 provided in the second embodiment of the present disclosure is substantially the same as that of the first embodiment. In other words, the description provided for the pipe inspection camera system 10 in the first embodiment is generally applicable to the pipe inspection camera system 10 in the second embodiment. The following description will primarily focus on the differences and key aspects between the second embodiment and the first embodiment.

In the second embodiment, an installation position of the first wheel assembly 52 differs from that in the first embodiment. Specifically, in this embodiment, the first wheel assembly 52 is installed on the side of the first support frame 511. The support body 51 further includes at least one support member 517 connected to the bottom of the second support frame 512. The at least one support member 517 is configured together with the first wheel assembly 52 to support the pipe inspection camera system 10 on the ground. Specifically, the at least one support member 517 may include two support posts.

Furthermore, in this embodiment, the support body 51 further includes at least one support protrusion 516. The at least one support protrusion 516 is connected to one of the fixing members 515 at the top and is configured, in conjunction with the first wheel assembly 52, to support the pipe inspection camera system 10 on the ground when the telescopic pull rod assembly 53 is placed adjacent to the ground.

Embodiment III

Figure 15:
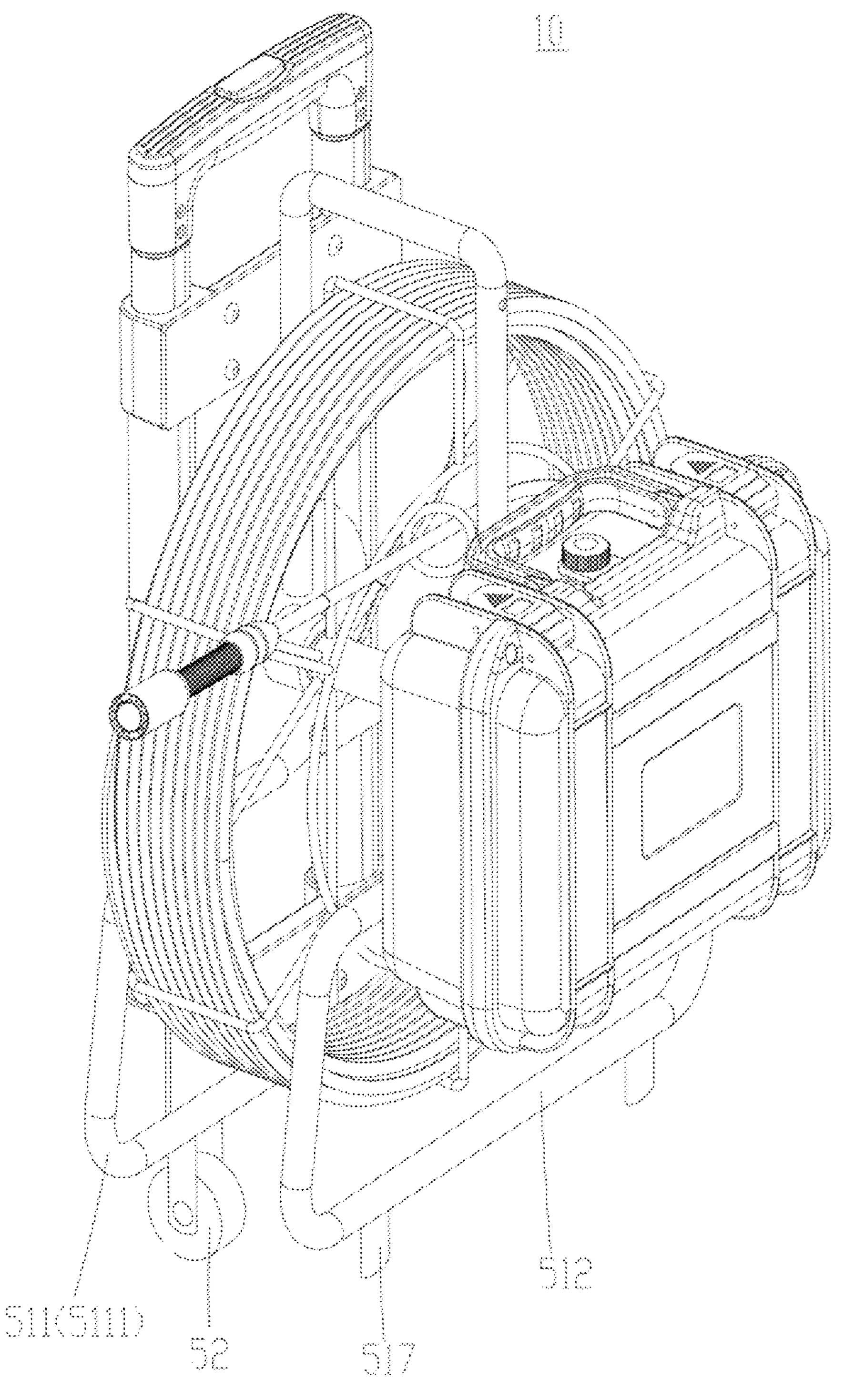
FIG. 15 is a schematic view of a support device of a pipe inspection camera system according to a third embodiment of the present disclosure.

Please referring to FIG. 15, the pipe inspection camera system 10 provided in the third embodiment of the present disclosure is essentially the same as the pipe inspection camera system 10 of the first embodiment. In other words, the descriptions of the pipe inspection camera system 10 in the first embodiment is generally applicable to the pipe inspection camera system 10 in the third embodiment. The following description will primarily focus on the differences and key aspects between the third embodiment and the first embodiment.

In the third embodiment, an installation position of the first wheel assembly 52 differs from that in the first embodiment. Specifically, in this embodiment, the first wheel assembly 52 is installed at the bottom of the first support frame 511, not in the rear side of the first support frame 511 as in the first embodiment. The support body 51 further includes at least one support portion 517. The at least one support portion 517 is connected to the bottom of the second support frame 512 and is configured together with the first wheel assembly 52 to support the pipe inspection camera system 10 on the ground. Specifically, the at least one support portion 517 may include two support posts.

Embodiment IV

Figure 16:
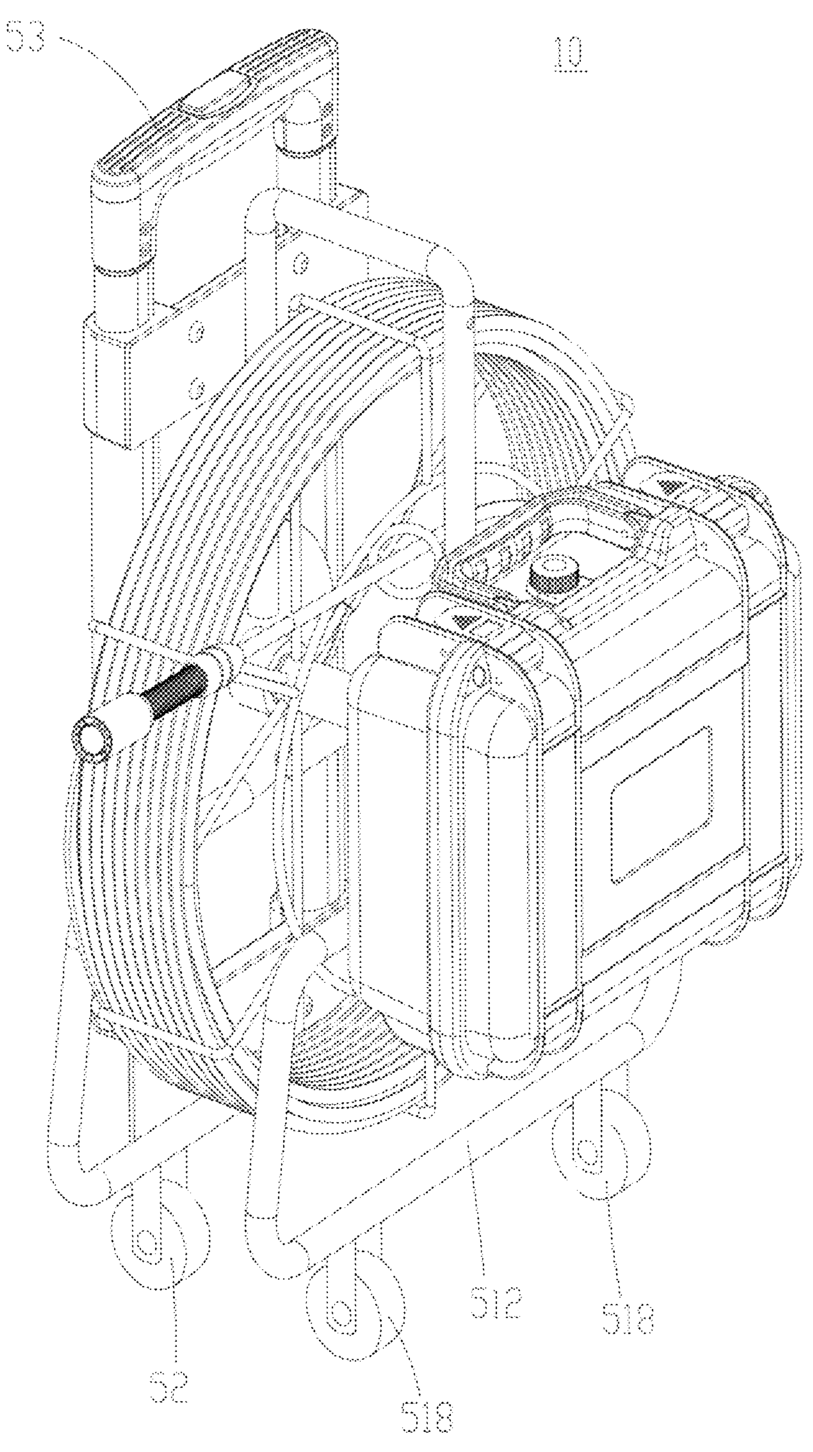
FIG. 16 is a schematic view of a support device of a pipe inspection camera system according to a fourth embodiment of the present disclosure.

Please refer to FIG. 16. The pipe inspection camera system 10 provided in the fourth embodiment of the present disclosure is substantially the same as the pipe inspection camera system 10 of the third embodiment. In other words, the description for the pipe inspection camera system 10 in the third embodiment is generally applicable to the pipe inspection camera system 10 of the fourth embodiment. The following description will primarily focus on the differences and key aspects between the fourth embodiment and the third embodiment.

In the fourth embodiment, the support body 51 further includes a second wheel assembly 518. The second wheel assembly 518 is connected to the bottom of the second support frame 512 and is configured together with the first wheel assembly 52 to support the pipe inspection camera system 10 on the ground. The telescopic pull rod assembly 53 is configured in conjunction with the first wheel assembly 52 and the second wheel assembly 518 to facilitate movement of the pipe inspection camera system 10. It can be understood that with configurations of both the first wheel assembly 52 and the second wheel assemblies 518, there is no need to tilt the pipe inspection camera system 10 for movement, making it more convenient for the user.

Embodiment V

Figure 17:
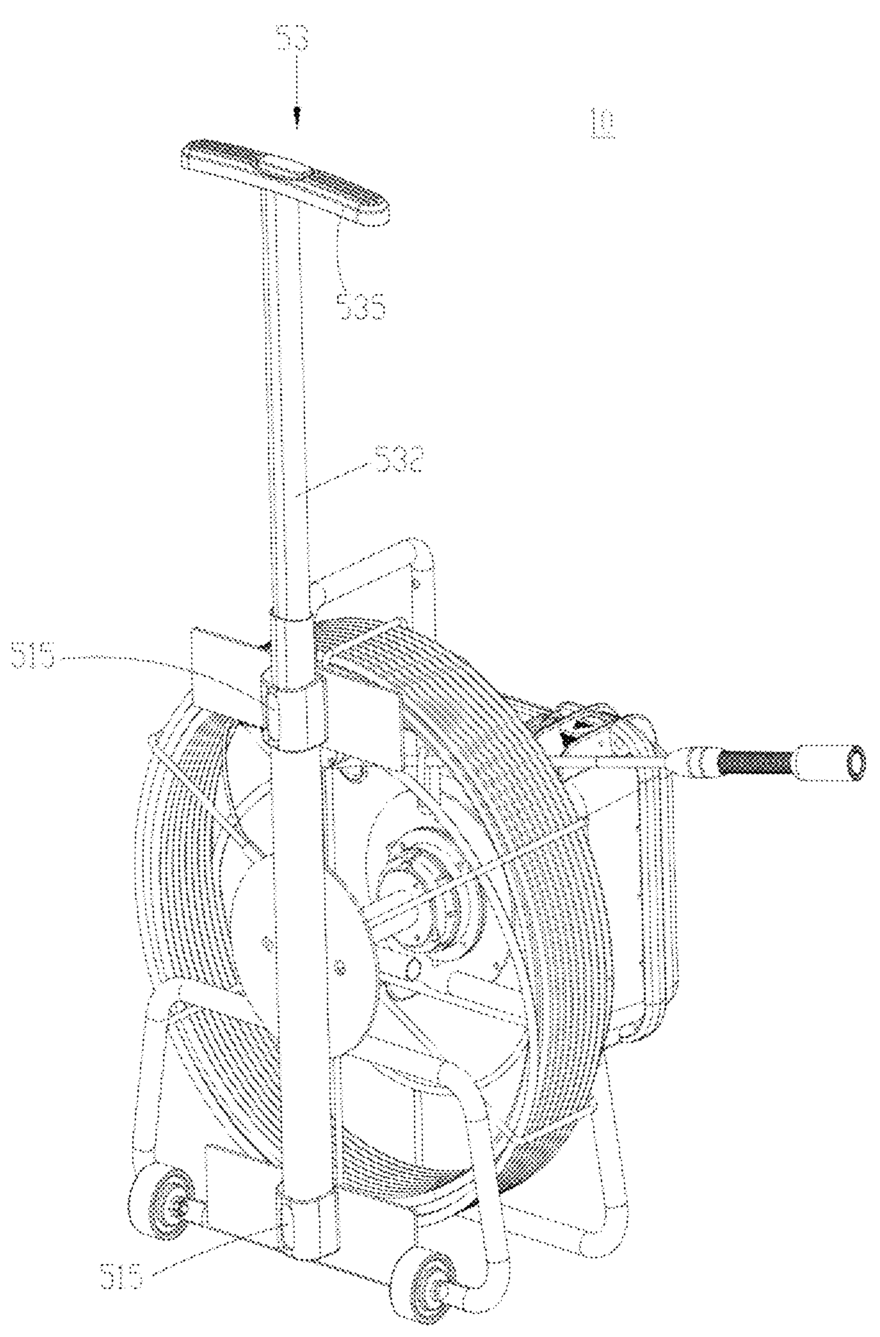
FIG. 17 is a schematic view of a pipe inspection camera system according to a fifth embodiment of the present disclosure.
Figure 18:
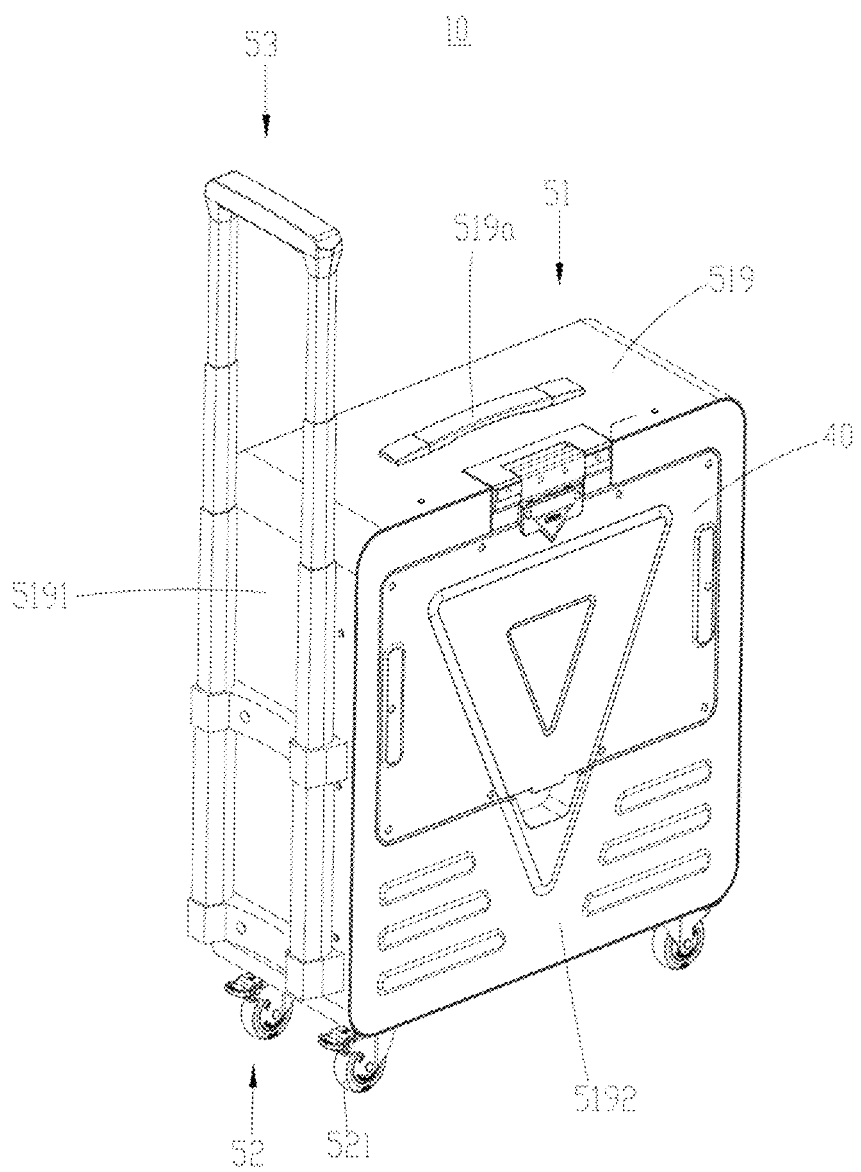
FIG. 18 is a schematic view of a pipe inspection camera system according to a sixth embodiment of the present disclosure.
Figure 19:
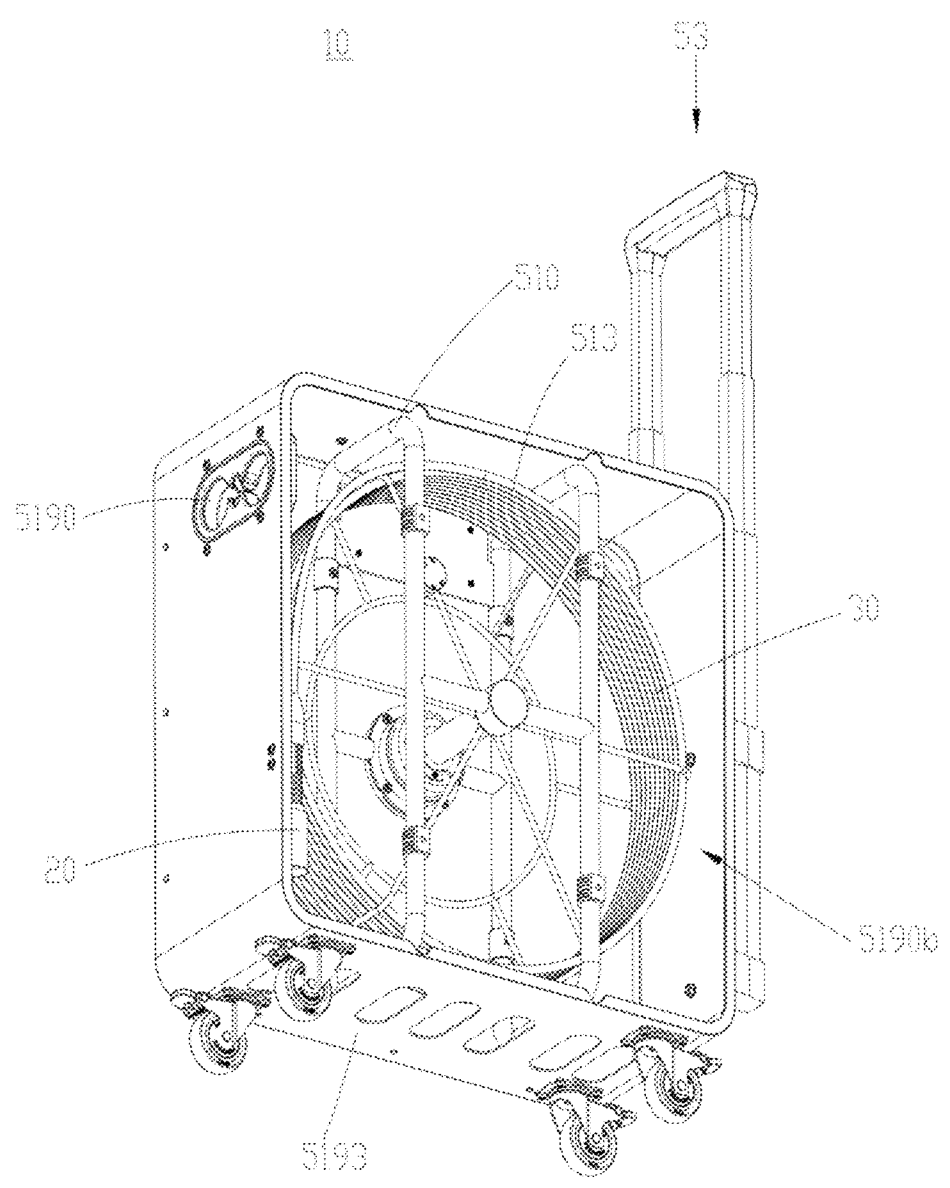
FIG. 19 is a schematic view of the pipe inspection camera system according to the sixth embodiment of the present disclosure from another perspective.
Figure 20:
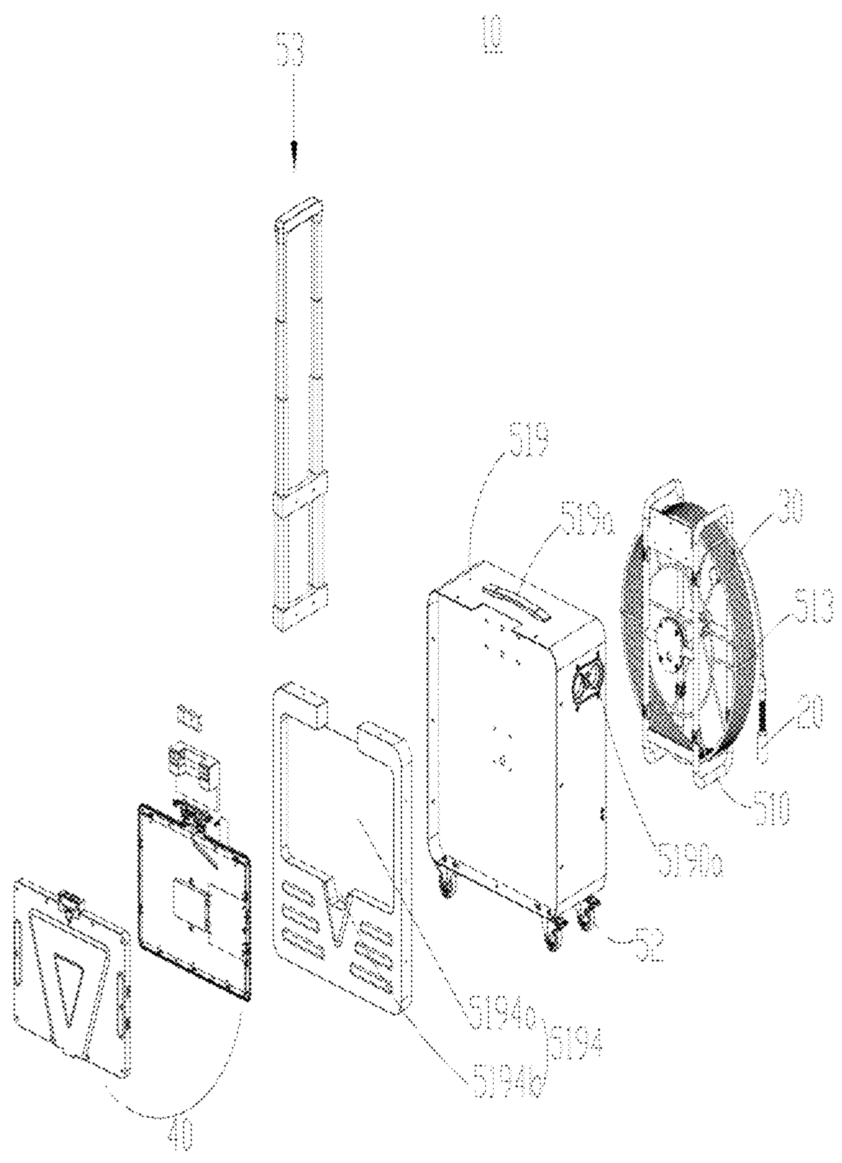
FIG. 20 is an exploded view of the pipe inspection camera system according to the sixth embodiment of the present disclosure.
Figure 21:
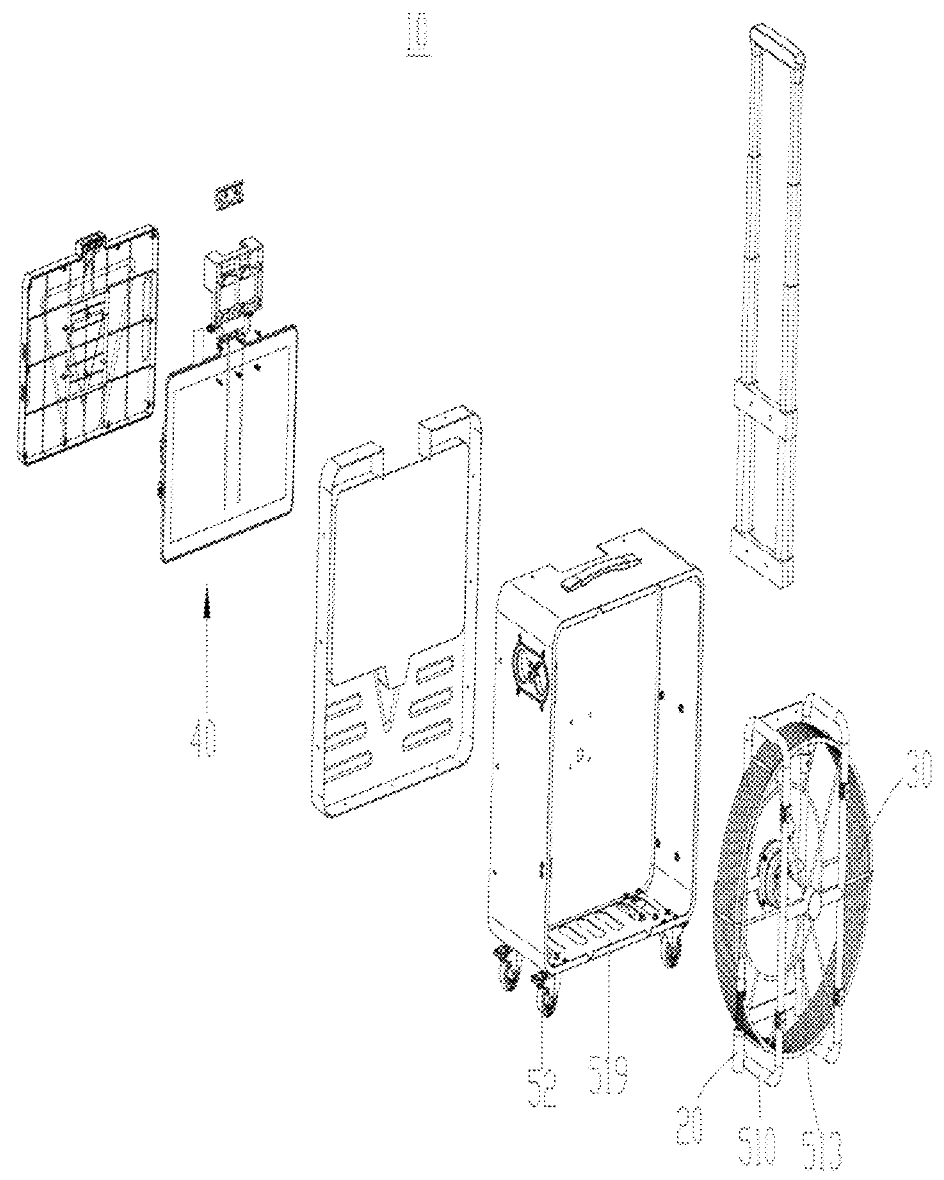
FIG. 21 is an exploded view of the pipe inspection camera system according to the sixth embodiment of the present disclosure from another perspective.
Figure 22:
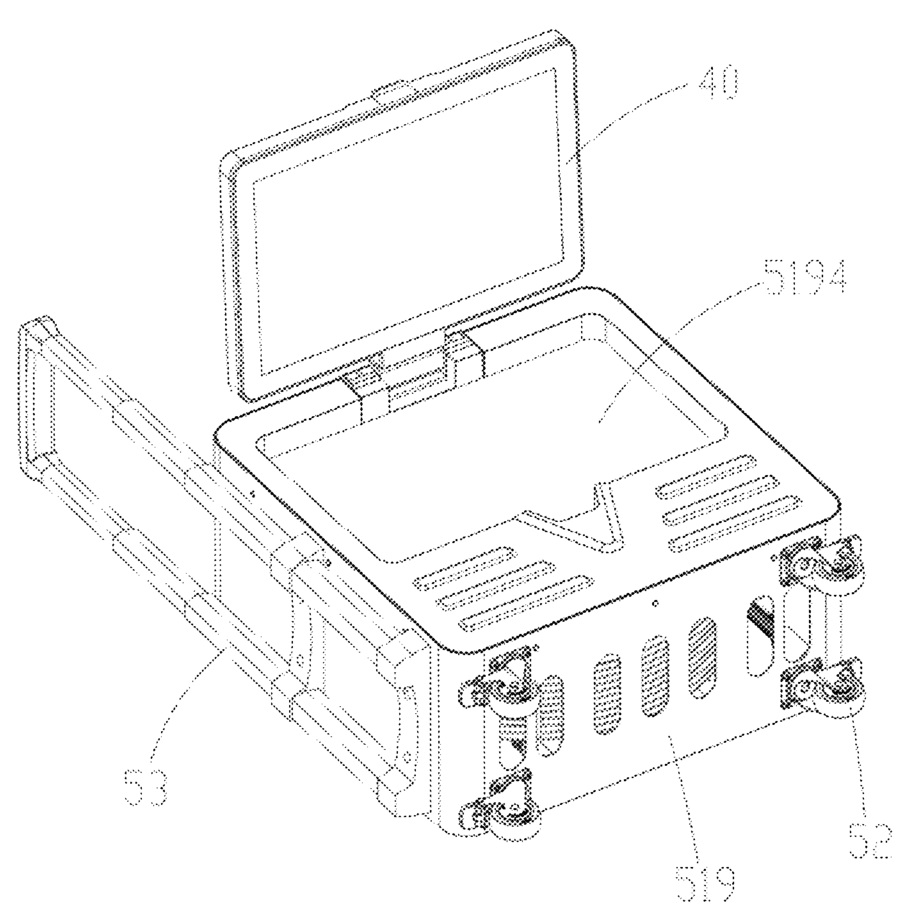
FIG. 22 is a schematic view of a display module of the pipe inspection camera system according to the sixth embodiment of the present disclosure in a use state.

Please refer to FIG. 17. The pipe inspection camera system 10 provided in the fifth embodiment of the present disclosure is essentially the same as the pipe inspection camera system 10 of the first embodiment. In other words, the description for the pipe inspection camera system 10 in the first embodiment is generally applicable to the pipe inspection camera system 10 in the fifth embodiment. The following description will primarily focus on the differences and key aspects between the fifth embodiment and the first embodiment.

In this embodiment, the structure of the telescopic pull rod assembly 53 differs from that in the first embodiment. The telescopic pull rod assembly 53 is a T-shaped pull rod, including a first rod segment 531 and at least one second rod segment 532 telescopically connected to the first rod segment 531. At least part of the at least one second rod segment 532 can be slidably retracted into the first rod segment 531, allowing the height of the telescopic pull rod assembly 53 to be adjusted. The first rod segment 531 and the at least one second rod segment 532 are essentially the same as those in the first embodiment. A first connecting rod 535 is perpendicularly connected to the top of the at least one second rod segment 532, and each of at least one first fixing member 515 is provided with at least one through-hole to secure the first rod segment 531 and/or the at least one second rod segment 532.

Embodiment VI

Please refer to FIGS. 18-22, the pipe inspection camera system 10 provided in the sixth embodiment of the present disclosure is essentially the same as the pipe inspection camera system 10 of the first embodiment. In other words, the description for the pipe inspection camera system 10 of the first embodiment is generally applicable to the pipe inspection camera system 10 in the sixth embodiment. The following description will primarily focus on the differences and key aspects between the sixth embodiment and the first embodiment.

In this embodiment, the support body 51 includes a storage box 519. The first wheel assembly 52 is arranged at a bottom of the storage box 519, and the telescopic pull rod assembly 53 is arranged on a first side surface 5191 of the storage box 519. The first wheel assembly 52 includes at least three wheels 521. The cable 30 is located inside the storage box 519. The storage box 519 includes at least one opening 5190 configured to allow the cable 30 to extend out of the storage box 519 therethrough to be connected to the endoscopic camera 20. The display module 40 is arranged on a second side surface 5192 of the storage box 519, which is different from the first side surface 5191. Both the first side surface 5191 and the second side surface 5192 are adjacent to the bottom surface 5193 of the storage box 519. It can be understood that the storage box 519 not only protects the cable 30, the endoscopic camera 20, and the display module 40 but also have the pipe inspection camera system 10 in a cleaner and more aesthetically pleasing appearance.

Specifically, the display module 40 is rotatably connected to the second side surface 5192 of the storage box 519, allowing it to switch between a stored state, where it is stored on second side surface 5192, and a use state, where it is opened relative to the storage box 519. It can be understood that this configuration also allows the display module 40 to be stored and protected when not in use, occupying less space and facilitating portability.

The support body 51 further includes a carrying handle **519*a* connected to a side of the storage box 519 facing away the first wheel assembly 52**.

The second side surface 5192 defines a display module storage recess 5194. In the stored state, the display module 40 is received in the display module storage recess 5194. The display module storage recess 5194 includes a main section **5194*a* that receives the display module and an extension section 5194***b* communicated with the main section 5194*a*. The extension section 5194*b* facilitates user operation to switch the display module 40 from the stored state to the use state.

The at least one opening 5190 includes a first opening 5190 *a* arranged on a side of the storage box 519 facing away the telescopic pull rod assembly 53 and a second opening 5190*b* located on a side of the storage box 519 facing away the first wheel assembly 52. The first opening 5190*a* is configured to allow the cable 30 to extend out of the storage box 519 to be connected to the endoscopic camera 20. The second opening 5190*b* exposes the cable 30, which allows users to observe and/or access the cable 30 and the endoscopic camera 20 through the second opening.

The support body 51 further includes a support frame 510 and a cable reel 513. The cable 30 is arranged on the cable reel 513. The support frame 510 is located inside the storage box 519. The cable reel 513 and the cable 30 are located on the inner side of the support frame 510. Furthermore, the cable reel 513 can rotate relative to the support frame 510 to bring the cable 30 to wind or unwind on the cable reel 513, thereby adjusting the extension length of the endoscopic camera 20 and the cable 30.

Although specific descriptions have been provided in conjunction with the accompanying drawings and embodiments in the present disclosure, it is understood that the above descriptions do not limit this invention in any form. Those skilled in the art can make deformations and changes to the present disclosure according to needs without deviating from the essence and scope of this invention, and these deformations and changes all fall within the scope of this invention.

What is claimed is:

1. A pipe inspection camera system, comprising: an endoscopic camera, configured to capture images of an interior of a pipeline; a display module, configured to be electrically connected to a cable to receive and display the images captured by the endoscopic camera; the cable, configured to electrically connect the endoscopic camera and the display module; and a support device, comprising a support body, a first wheel assembly connected to the support body, and a telescopic pull rod assembly connected to the support body; wherein the support body is configured to carry the endoscopic camera, the cable, and the display module, and the telescopic pull rod assembly is configured to cooperate with the first wheel assembly to allow users to move the pipe inspection camera system; wherein the support body comprises a first support frame and a second support frame connected to the first support frame; first support frame and the second support frame are arranged opposite to each other; the cable is arranged between the first support frame and the second support frame; the telescopic pull rod assembly is connected to the first support frame, the first wheel assembly is rotatably connected to a bottom of the first support frame, and the display module is connected to the second support frame.

2. The pipe inspection camera system according to claim 1, wherein the telescopic pull rod assembly comprises a first rod segment and at least one second rod segment telescopically connected to the first rod segment; at least part of the at least one second rod segment is configured to be slidably into or out of the first rod segment to adjust a height of the telescopic pull rod assembly.

3. The pipe inspection camera system according to claim 2, wherein the telescopic pull rod assembly comprises a first connecting rod connected to the at least one second rod segment, an extension direction of the first connecting rod is substantially perpendicular to a telescoping direction of the telescopic pull rod assembly; the first connecting rod is configured to allow a user to operate to drive at least part of the at least one second rod segment to slide into or out of the first rod segment, thereby changing the height of the telescopic pull rod assembly.

4. The pipe inspection camera system according to claim 3, wherein the telescopic pull rod assembly further comprises a third rod segment and at least one fourth rod segment telescopically connected to the third rod segment; at least part of the at least one fourth rod segment is configured to be slidably into or out of the third rod segment, the first connecting rod is connected between the at least one second rod segment and the at least one fourth rod segment, operation on the first connecting rod is capable of driving the at least one second rod segment and the at least one fourth rod segment to slide into or out of the first rod segment and the third rod segment respectively, so as to change the height of the telescopic pull rod assembly.

5. The pipe inspection camera system according to claim 3, wherein the telescopic pull rod assembly further comprises a locking assembly, at least a portion of the locking assembly is arranged on the first connecting rod, the locking assembly is configured to lock a position of the at least one second rod segment relative to the first rod segment; when the locking assembly is in a locked state, the position of the at least one second rod segment relative to the first rod segment is fixed to fix the height of the telescopic pull rod assembly; when the locking assembly is operated to an unlocked state, operation on the first connecting rod is capable of driving at least part of the at least one second rod segment to slide into or out of the first rod segment to change the height of the telescopic pull rod assembly.

6. The pipe inspection camera system according to claim 2, wherein the at least one second rod segment comprises a first sub-rod segment and a second sub-rod segment; the first sub-rod segment is slidably connected to the first rod segment and at least part of the first sub-rod segment is capable of sliding into or out of the first rod segment; the second sub-rod segment is slidably connected to the first sub-rod segment and at least part of the second sub-rod segment is capable of sliding into or out of the first sub-rod segment.

7. The pipe inspection camera system according to claim 1, wherein the support body further comprises cable reel connected between the first support frame and the second support frame; the cable reel is rotatable relative to the support frame to wind or unwind the cable on the cable reel, thereby adjusting an extension length of the endoscopic camera and the cable; the support body further comprises a carrying handle connected between the first support frame and the second support frame at a top of the support body; the carrying handle is arranged on an outer side of the cable reel; the carry handle comprises a U-shaped portion configured to partially surround opposite sides and a top side of the cable reel.

8. The pipe inspection camera system according to claim 7, wherein the cable reel comprises a connecting shaft, a fixing frame, and a connecting frame; the fixing frame comprises a plurality of limiting portions configured to encircle a periphery of the cable to limit a portion of the cable; the connecting frame is arranged on a side of the cable and is connected to one end of the plurality of limiting portions; the connecting shaft is connected to another end of the plurality of limiting portions; both two opposite ends of the connecting shaft are rotatably connected to the first support frame and the second support frame to allow the cable reel to rotate relative to the support body to bring the cable to wind or unwind on the cable reel, thereby adjusting the extension length of the endoscopic camera and the cable.

9. The pipe inspection camera system according to claim 1, wherein the first support frame comprises a first support bracket and a first connecting member; the first support bracket is connected to the telescopic pull rod assembly, the first wheel assembly is connected to the bottom of the first support bracket, and the first connecting member is connected to a top end of the first support bracket; the second support frame comprises a second support bracket and a second connecting member; a bottom of the second support bracket is connected to the bottom of the first support bracket, and the second connecting member is connected to a top of the second support bracket; the second connecting member is arranged opposite to the first connecting member; and the display module is connected to the second connecting member and arranged on a side of the second connecting member facing away the first connector.

10. The pipe inspection camera system according to claim 1, wherein the support body further comprises at least one fixing member connected to the first support frame and each of the at least one fixing member defines a first through-hole; the telescopic pull rod assembly comprises a first rod segment and at least one second rod segment slidably connected to the first rod segment, and at least part of the first rod segment extends through the first through-hole and fixed in the first through-hole.

11. The pipe inspection camera system according to claim 10, wherein the telescopic pull rod assembly further comprises a third rod segment and at least one fourth rod segment slidably connected to the third rod segment; each of the at least one fixing member further defines a second through-hole, and at least part of the third rod segment extends through the second through-hole and fixed in the second through-hole; the at least one fixing member is connected between the first rod segment and the third rod segment;

the at least one fixing member comprises two fixing members, one of the two fixing members is connected between a bottom of the first rod segment and a bottom of the third rod segment, and another of the two fixing members is connected between a top of the first rod segment and a top of the third rod segment.

12. The pipe inspection camera system according to claim 10, wherein the support body further comprises at least one support protrusion connected to a side of the at least one fixing member facing away from the first support frame and configured to support the telescopic pull rod assembly on the ground when the telescopic pull rod assembly is placed adjacent to the ground.

13. The pipe inspection camera system according to claim 1, wherein the support body further comprises at least one support member connected to a bottom of the second support frame and configured together with the first wheel assembly to support the pipe inspection camera system on the ground.

14. The pipe inspection camera system according to claim 1, wherein the support body further comprises a second wheel assembly connected to a bottom of the second support frame and configured together with the first wheel assembly to support the pipe inspection camera system on the ground.

15. The pipe inspection camera system according to claim 1, wherein the first support frame comprises a first support bracket; the first wheel assembly comprises at least two wheels, each of the at least two wheels is rotatably connected to a bottom of the first support bracket through a bearing, and the at least two wheels configured together with the bottom of the second support frame to support the pipe inspection camera system on the ground.

16. The pipe inspection camera system according to claim 1, wherein the support body comprises a storage box; the first wheel assembly is arranged at a bottom of the storage box, the telescopic pull rod assembly is arranged on a first side surface of the storage box; the first wheel assembly comprises at least three wheels; the cable is arranged in the storage box; the storage box defines at least one opening configured to allow the cable and the endoscopic camera connected to the cable to extend out of the storage box therethrough; the display module is arranged on a second side surface of the storage box different from the first side surface; and both the first side surface and the second side surface are connected to the bottom of the storage box.

17. The pipe inspection camera system according to claim 16, wherein the display module is rotatably connected to the second side surface of the storage box, the display module is configured to be switched between a stored state where the display module is stored on the second side surface and a use state where the display module is opened relative to the storage box; and the support body further comprises a carrying handle connected to a side of the storage box facing away the first wheel assembly.

18. The pipe inspection camera system according to claim 17, wherein the second side surface defines a display module recess, in the stored state, the display module is received in the display module storage recess; the display module storage recess comprises a main section configured to receive the display module and an extension section communicated with the main section, the extension section is configured to facilitate a user to rotate the display module from the stored state to the use state; the at least one opening comprises a first opening arranged on a side of the storage box facing away the telescopic pull rod assembly and a second opening arranged on a side of the storage box facing away the first wheel assembly; the first opening is configured to allow the endoscopic camera and the cable to extend out of the storage box therethrough, and the second opening is configured to expose the cable.

19. The pipe inspection camera system according to claim 1, wherein the support body further comprises a support frame and a cable reel; the cable is arranged on the cable reel, the support frame is arranged in the storage box, both the cable reel and the cable is arranged in the support frame, the cable reel is configured to rotate relative to the support frame to bring the cable to wind and unwind on the cable reel, thereby adjusting the extension length of the endoscopic camera and the cable.

20. A pipe inspection camera system, comprising:

an endoscopic camera, configured to capture images of an interior of a pipeline;

a cable, configured to electrically connect the endoscopic camera; and a support device, comprising a support body, a first wheel assembly connected to the support body, and a telescopic pull rod assembly connected to the support body; wherein the support body is configured to carry the endoscopic camera, and the cable, and the telescopic pull rod assembly is configured to cooperate with the first wheel assembly to allow users to move the pipe inspection camera system;

wherein the telescopic pull rod assembly comprises a first rod segment and at least one second rod segment telescopically connected to the first rod segment; at least part of the at least one second rod segment is configured to be slidably into or out of the first rod segment to adjust a height of the telescopic pull rod assembly; and an extendable length of the at least one segment is greater than half of a length of the first rod segment.

* * * * *